(12) United States Patent
Bennett et al.

(10) Patent No.: US 9,177,060 B1
(45) Date of Patent: Nov. 3, 2015

(54) METHOD, SYSTEM AND APPARATUS FOR IDENTIFYING AND PARSING SOCIAL MEDIA INFORMATION FOR PROVIDING BUSINESS INTELLIGENCE

(76) Inventors: Michele Bennett, Wayne, PA (US);
Armon Vincent, Philadelphia, PA (US);
Jeff Dingle, Philadelphia, PA (US);
Charles Scott Reese, Evergreen, CO (US)

( * ) Notice: Subject to any disclaimer, the term of this patent is extended or adjusted under 35 U.S.C. 154(b) by 0 days.

(21) Appl. No.: 13/422,779

(22) Filed: Mar. 16, 2012

Related U.S. Application Data

(60) Provisional application No. 61/454,474, filed on Mar. 18, 2011.

(51) Int. Cl.
*G06F 17/30* (2006.01)

(52) U.S. Cl.
CPC .............................. *G06F 17/30864* (2013.01)

(58) Field of Classification Search
CPC .............................................. G06F 17/308964
USPC ........................................ 707/709, 706, 708
See application file for complete search history.

(56) References Cited

U.S. PATENT DOCUMENTS

| | | | | |
|---|---|---|---|---|
| 6,665,659 | B1 * | 12/2003 | Logan | 1/1 |
| 7,756,807 | B1 * | 7/2010 | Komissarchik et al. | 706/46 |
| 8,095,432 | B1 * | 1/2012 | Berman et al. | 705/26.7 |
| 8,260,774 | B1 * | 9/2012 | Aggarwal | 707/723 |
| 8,375,024 | B2 * | 2/2013 | Goeldi | 707/722 |
| 8,504,550 | B2 * | 8/2013 | Hall et al. | 707/710 |
| 8,554,709 | B2 * | 10/2013 | Goodson et al. | 706/45 |
| 8,626,823 | B2 * | 1/2014 | Kumar | 709/203 |
| 8,676,875 | B1 * | 3/2014 | Smith et al. | 709/200 |
| 2001/0056460 | A1 * | 12/2001 | Sahota et al. | 709/201 |
| 2002/0194161 | A1 * | 12/2002 | McNamee et al. | 707/2 |
| 2006/0190561 | A1 * | 8/2006 | Conboy et al. | 709/217 |
| 2007/0214097 | A1 * | 9/2007 | Parsons et al. | 706/12 |
| 2007/0260520 | A1 * | 11/2007 | Jha et al. | 705/14 |
| 2008/0059873 | A1 * | 3/2008 | Oezgen | 715/234 |
| 2008/0109481 | A1 * | 5/2008 | Catanzariti et al. | 707/104.1 |
| 2008/0133488 | A1 * | 6/2008 | Bandaru et al. | 707/3 |
| 2009/0249451 | A1 * | 10/2009 | Su et al. | 726/5 |
| 2010/0010826 | A1 * | 1/2010 | Rosenthal et al. | 705/1 |
| 2010/0030752 | A1 * | 2/2010 | Goldentouch | 707/3 |

(Continued)

OTHER PUBLICATIONS

Hardas—(Pre-processing web/blog data: A survey of tools—May 2007) (http://www.cs.kent.edu/~mhardas/non- refered/HardasMay07PreprocessingwebblogdataSurveyofTools.pdf).*

*Primary Examiner* — Miranda Le
(74) *Attorney, Agent, or Firm* — Dickinson Wright PLLC

(57) ABSTRACT

A method, system and apparatus are provided to identify, collect and parse content for business intelligence. Particularly, the method, system and apparatus provide for deriving, over a communication network, knowledge from information indicative of human communication, emotions, reactions, and experiences to evaluate trends and decisions that impact business. Also, a system, method and apparatus are provided for processing and analyzing social media conversations via one or more modules communicating with a social cognition technology platform. A module according to an exemplary implementation of the present invention, implements next-generation business intelligence that finds, aggregates, and interprets an exhaustive source of digital Internet content (such as textual and voice conversational, and word-of-mouth content) in conjunction with a social cognition technology platform.

12 Claims, 32 Drawing Sheets

(56) References Cited

U.S. PATENT DOCUMENTS

| | | | |
|---|---|---|---|
| 2010/0058195 A1* | 3/2010 | Stefik et al. | 715/744 |
| 2010/0070485 A1* | 3/2010 | Parsons et al. | 707/709 |
| 2010/0132049 A1* | 5/2010 | Vernal et al. | 726/27 |
| 2010/0185935 A1* | 7/2010 | Yang et al. | 715/234 |
| 2011/0178868 A1* | 7/2011 | Garg et al. | 705/14.45 |
| 2011/0320542 A1* | 12/2011 | Bendel et al. | 709/206 |
| 2012/0047219 A1* | 2/2012 | Feng et al. | 709/207 |
| 2012/0066226 A1* | 3/2012 | Moshrefi et al. | 707/740 |

* cited by examiner

Topic Cloud / Verbatim Links

WEBDIG IDENTIFIES THE WORDS MOST FREQUENTLY USED WITHIN CONVERSATIONS BASED ON SPECIFIC SUB-TOPICS AND SENTIMENT.

601

WEBDIG HAS BROKEN OUT THE WORD CLOUDS BY SUB-TOPICS (ASTHMA BRANDS) AND POSITIVE VS. NEGATIVE CONVERSATIONS

602 — AS SEEN ON THE NEXT SLIDE, WEBDIG PROVIDES THE USER A VERBATIM SEARCH BASED ON THE WORD "PRICE" WITHIN POSITIVE USER GENERATED CONTENT FOR "SINGULAIR"

600 wool.labs
digital woven goods

REPORTS · USERS · MY ACCOUNT · LOG OUT

WEBDIG   ACTIVE LISTENING

REPORT ANALYSIS   CONVERSATIONS   TWITTER   TOPICS   VERBATIMS   TOP SITES   INBOUND LINKS   TRENDS

SINGULAIR POSITIVE
PHARMACY ALLERGY PRICE ASTHMA GOOD BEST INFORMATION REQUIRED DOSAGE CHILDREN ALLERGIES DOCTOR MEDICINE SAMPLE ALCOHOL EFFECT CAUSE PATIENT PRODUCT LOSS

SINGULAIR NEGATIVE
SIDE EFFECTS DRUG PRICE PHARMACY ASTHMA WEIGHT CANADA INSURANCE COST BLOOD DEPRESSION MEDICINE ALLERGY REQUIRED SYMPTOMS DOSAGE ALCOHOL EFFECT CAUSE CHILDREN PREGNANCY DOCTOR PROBLEMS

SEREVENT POSITIVE
DRUG PHARMACY EFFECTS ASTHMA

SEREVENT NEGATIVE
DRUG PHARMACY EFFECTS ASTHMA

PULMICORT POSITIVE
ASTHMA PHARMACY BEST EFFECTS INHALER GOOD

PULMICORT NEGATIVE
ASTHMA PHARMACY CANADA DRUG USA

FLOVENT POSITIVE
MOTRIN EFFECTS DRUG ASTHMA

FLOVENT NEGATIVE
EFFECTS SIDE DRUG ASTHMA

ALBUTEROL POSITIVE
EFFECTS DRUG PRESCRIPTION

ALBUTEROL NEGATIVE
EFFECTS DRUG PRESCRIPTION

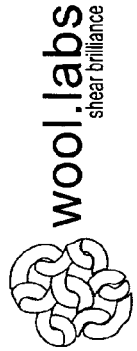

DEEPER UNDERSTANDING COMES FROM USING ADSLIDER AND WEBDIG TO GAIN INSIGHTS THAT ALSO INFLUENCE THE INDEXES WITH INFORMATION THAT IS TOTALLY UNIQUE IN THE MARKET ESPECIALLY WHEN COMBINED WITH THE INDEXES

- ADSLIDER IS USED TO GAIN EXTENDED INTELLIGENCE BY POLLING AND SURVEYING POSTERS TO UNDERSTAND WHY AND HOW THEY MAKE DECISIONS
- WEBDIG DIGS INTO SPECIFIC TOPICS
  ✓ THAT ARE NEW, POTENTIALLY IMPACTFUL, OR DISRUPTIVE
  ✓ INDEXES SIGNAL THE NEED FOR MORE INFORMATION

| TICKER | TODAY | | | | | THIS WEEK | | | | | THIS MONTH | | | | |
|---|---|---|---|---|---|---|---|---|---|---|---|---|---|---|---|
| | POS | NEU | NEG | INTENSITY | SI | POS | NEU | NEG | INTENSITY | SI | POS | NEU | NEG | INTENSITY | SI |
| AMZN | 65 | 113 | 22 | L | 22 | 462 | 756 | 134 | L | 24 | 1922 | 3300 | 658 | L | 21 |
| JNJ | 85 | 375 | 222 | H | -35 | 522 | 2720 | 2074 | H | -44 | 2400 | 11222 | 6709 | H | -32 |
| DELL | 154 | 207 | 197 | H | -11 | 875 | 1423 | 782 | M | 4 | 3670 | 6302 | 2867 | L | 8 |
| TTWO | 200 | 153 | 18 | H | 72 | 1326 | 1645 | 145 | H | 69 | 4301 | 4590 | 543 | M | 49 |

FIG. 20

METHOD, SYSTEM AND APPARATUS FOR IDENTIFYING AND PARSING SOCIAL MEDIA INFORMATION FOR PROVIDING BUSINESS INTELLIGENCE

CROSS-REFERENCE TO RELATED PATENT APPLICATION

This application claims the benefit under 35 U.S.C. §119 (e) of U.S. Provisional Patent Application. No. 61/454,474, filed on Mar. 18, 2011 in the U.S. Patent and Trademark Office, the entire disclosure of which is hereby incorporated by reference.

FIELD OF THE INVENTION

The present invention relates to a computer implemented method, system and apparatus for identifying, collecting and parsing content for providing business intelligence. Particularly, the present invention provides a method, system and apparatus for deriving knowledge from information indicative of human communication, emotions, reactions, and experiences to evaluate trends and decisions that impact business.

BACKGROUND OF THE INVENTION

As media continues to become increasingly social, expression of opinion has never been as open or as pervasive. In today's highly interactive information environment, complete understanding of sentiment, emerging topics and influential voices through all media channels is critical to maintaining informational advantages over your competition. Social cognition helps enterprise entities to utilize technological solutions to solve complex business challenges.

Conventional Web crawler systems (such as Google, Yahoo, etc.) search for data on the Internet, however, these systems leave pockets of information that was not searched, thus leaving large amounts of data not utilized for business intelligence.

In this regard, while conventional Web search systems provide search results for content on the Internet, the results of these conventional systems are unorganized, topical, limited and/or lacking analysis. Other convention systems that require really simple syndication ("RSS") or manual feed have further drawbacks including but not limited to irrelevant results, relying on push data, limited results, and high dissatisfactions.

Also, conventional Web search systems index Web sites according to the Web site's content and type but not by topic. These systems utilize spiders that regularly crawl the Web to rebuild their index, where crawls can be based on Webpage rank, links to the Web page, number of parameters in a URL, dynamic vs. static pages, and/or any number of factors that can affect the crawl frequency of individual Web sites. Various algorithms determine which Websites to crawl, the frequency of crawls, and quantity of data to fetch from each Website. Hence, according to conventional Web search systems, not all pages on all sites are updated with the same frequency because the update process may take a very long time (4-15, or more, days) to go through the entire Internet.

Likewise, conventional social media monitoring systems provided analysis based on limited data. These systems rely on data feeds which limit their access to a small amount of available data, and the limited publication tool.

Embodiments and/or implementations of the present invention propose methods, systems and apparatuses for addressing at least the above noted drawbacks of conventional systems and methodology.

SUMMARY OF THE INVENTION

As noted above, exemplary embodiments of the present invention address at least the above noted problems and/or disadvantages in conventional systems and methodologies, and provide at least the following advantages. Exemplary embodiments of the present invention provide a computer executed system, method and apparatus for parsing, retrieving and reporting content from Websites. For example, user comments and conversations from social media Websites.

Exemplary embodiments of the present invention provide a computer executed system, method and/or apparatus implementing business intelligence algorithms to analyze content gathered from the Internet, television and radio stations, document repositories, and to deliver the results via a configured and/or customized graphical user interfaces.

Other, exemplary embodiments of the present invention provide a computer implemented system, method and/or apparatus that provides for discovering, aggregating, and parsing an exhaustive source of digital text-based content. Exemplary implementations utilize configured algorithms and spiders without requiring RSS feeds, gather and report entire relevant content, provide fully trainable artificial intelligence natural language processing to enhance accuracy, provide for understanding of sentiment ranges (fear, joy, pride, sarcasm), tracking of the delta of sentiment over selected time periods, full access of specific verbatim, conversation threads and sources, and delivery of fully customizable dashboards or datasets.

Yet other exemplary embodiments of the present invention provide a multi-layered process to speed up indexing and categorizing of Web sites by type and/or topic. An exemplary implementation of the present invention provides a computer executed system, method and/or apparatus for continuous crawling of the Web for new social media sites which then move to a permanent index updated regularly (for example, weekly), separates Websites by topic(s) and type(s), crawls for Websites with germane topics to keywords and relevant comments, and stores the relevant comments and relationships.

Yet other exemplary embodiments and/or implementations of the present invention provide systems and methods for adding new sites to the index on a regular basis (for example, daily), by de-coupling the process of indexing sites and comments across the Internet simultaneously, and thus overcoming deficiencies of conventional systems that do not provide for daily indexing.

Yet other exemplary implementations of the present invention provide a system, method and/or apparatus for storing Web sites according to a topic to facilitate identifying the Web sites as a potential source of comments for a given search. Further, exemplary implementations of the present invention provide a system, method and apparatus generating inter-day sentiment indexes by determining the most active Web sites on a particular topic and then searching the top Web sites.

Yet other exemplary embodiments of the present invention provide a computer executed system, method and/or apparatus for business intelligence that runs across multiple media and data sources, organizes content by topic and/or keywords, analyzes sentiment spectrum, and proactively capture the Internet content.

Yet other exemplary embodiments of the present invention provide a computer implemented system, method and apparatus implementing social cognition technology platform, such as ALPACA, to facilitate more in-depth analysis of dialogue data to uncover core insights and emerging trends to inform strategy, change behavior and drive new business opportunities. ALPACA gathers information from various sources (such as social media, user generated content, digital word of mouth, etc.), provides a platform that processes and presents the gathered information via a number of complementary modules, thus allowing entities to view the information for emerging trends, change behavior and drive new business opportunities.

Exemplary embodiments of the present invention utilize unique features of ALPACA for business intelligence platforms that process various media sources including digital, TV and Radio. Exemplary implementations of the present invention utilize ALPACA's advanced, proprietary search technologies, artificial intelligence, complex natural language processors, proprietary topical verbatim databases and a unique social search engine to extract, analyze and report on the impact of social opinion on an entity (such as a brand or company). Exemplary implementations utilize ALPACA to compile, screens, geo-locates, and analyzes natural language conversations and correlates them to topical reporting activity on TV, Radio, and the Web in over 200 languages.

According to yet other exemplary embodiments of the present invention, ALPACA is used to provide for multiple, complementary modules that process information across a continuum—from raw data to clean and targeted reporting that gives an entity an unbiased and more complete view of the attitudes and trends impacting business.

Another exemplary embodiment of the present invention provides a system, method and apparatus for generating a custom parser that parses Web sites on the Internet (such as a social media Web site) for identifying and differentiating Web comments on a Website. An exemplary implementation provides for accessing selective content of a Website without having to access the entire Web site.

Yet other exemplary embodiments of the present invention provide a computer implemented system, method and apparatus for processing and analyzing social media conversations, via one or more modules (referenced herein for consistency by a term "WebDig"), communicating with ALPACA. WebDig, according to an exemplary implementation of the present invention, implements next-generation business intelligence that finds, aggregates, and interprets an exhaustive source of digital Internet content (such as textual and voice conversational, and word-of-mouth ("WOM") content) in conjunction with ALPACA.

Yet other exemplary embodiments of the present invention provide a computer implemented system, method and apparatus that aggregates content from various television and/or radio stations (referenced herein for consistency by a term "DigTV"), via one or more module, communicating with ALPACA to monitor and report on the content, and combine the aggregated content with the content collected and processed by WebDig. An exemplary implementation of DigTV tracks trending topics online that influence television content/coverage. Yet another exemplary implementation of the present invention tracks television topics and how they translate to online conversations.

According to yet another exemplary embodiments of the present invention, DigTV provides a computer implemented system, method and/or apparatus that monitors raw footage from local and national broadcast networks, conducts a search for key words (either across all available broadcast networks and geographies, or specific stations and cities), implements a multimedia player to clip the relevant broadcast segment and translate the audio into text and report on the effect that broadcast media has on/from a social sphere, and provides a graphical user interface to present results in terms of, for example, data sets in conjunction with television broadcast signals.

Yet another exemplary embodiments of the present invention provide a computer implemented system, method and apparatus allowing individuals to engage in social media, via one or more module (referenced herein for consistency by a term "DigBar"), communicating with ALPACA.

Yet another exemplary embodiments of the present invention provide a computer system, method and apparatus implementing one or more modules (referenced herein for consistency by a term "AdSlider") communicating with ALPACA, to evaluate conversations that are happening in real time on one or more Websites and to "slide in" content that is relevant to the conversation on the Website as the conversation is taking place, essentially in real time.

Yet other exemplary embodiments of the present invention provide a computer system, method and apparatus implementing one or more modules communicating with ALPACA, to track user engagement on Websites and monitor changes in the sentiment polarity of user generated content in response to the content being delivered by multi-source social media context and sentiment content serving. Exemplary implementations of the present invention provide for at least one of the following features: tracking advertisements and topics, sentiment(s), and top conversation(s) related to the advertisements; and tracking advertisement related content across IP address so that topic and sentiment profile can be created per IP address.

Additionally, certain exemplary embodiments of the present invention provide a computer implemented system, method and apparatus combining one or more modules that communicate with ALPACA. An exemplary implementation of the present invention provides one or more computer implemented modules, applied individually or in combination, for observing trends in social media that are then picked up and repeated in a broadcast. For example, one or more modules implement a relational comparison of broadcast closed caption ("CC") comments to social media comments based on geographic distribution. DigTV and natural language processing, according to exemplary implementations, can analyze and report on closed caption signals broadcasted from television stations and/or social media content. Yet another exemplary implementation of the present invention provides a method, system and apparatus for mapping a geographic reach of television and radio stations to the topics and sentiments, then comparing that data to readership of similar comments within social media and measure the response(s) in a social sphere.

Additionally, an exemplary embodiment of the present invention provides a computerized system, method and apparatus that observes trends in social media that are then picked up and repeated in broadcast media. Furthermore, various exemplary embodiments of the present invention provide for at least one of the following features: geo-location of comment readers linked to geo footprint of a broadcast television or radio station; number of television mentions to the number of social media ("SM") mentions; alignment of television sentiment to social media sentiment; and number of viewers in relation to the number of readers expressed as a relation to population of a geographic area.

Yet other exemplary embodiments of the present invention provide a system, method and apparatus treating television content as a database of text, making television content the same as, for example, a social media database, or any other database of text or images. An exemplary implementation of the present invention provides one or more modules communicating with ALPACA for correlating between messages on television and writing on social media, thus, providing an analysis of sentiment, top topics and impact of messages.

Yet other exemplary embodiments of the present invention provide a system, method and apparatus implementing Web crawlers that seek/mine the entire Internet looking for topics of conversation, in conjunction with ALPACA. The Web crawlers, according to an exemplary implementation of the present invention, perform in-depth analysis into the Internet searching for data utilizing ALPACA starting anywhere on the Internet, launching crawlers to find small pockets of conversations occurring on the Internet.

Yet other exemplary embodiments of the present invention provide a system, method and apparatus screening Internet content for delivering specific data gathered from various media sources utilizing ALPACA, and providing screeners previewing sites to ensure their validity and computer implemented removal of spam, junk, link farms and other undesirable, unwanted and not-on-topic content.

Yet other exemplary embodiments of the present invention provide a system, method and apparatus implementing Natural Language Processing ("NLP") to put complex and industry-specific text into proper context for one or more selected topic, where. NPL, after screening, is trainable over a short and/or long term period time to put complex and industry-specific text into proper context for each topic. In an exemplary implementation, ALPACA can implement one or more screening processes, at least once per topic, to analyze a small subset of the overall content to determine their sentiment and relevance for creating a training set. The training set can be implemented to organize the rest of the overall content, which could include tens of millions of data points.

Yet other exemplary embodiments of the present invention provide a system, method and apparatus implementing an internal search engine allowing users to search through a subset and/or a full set of the retained content multiple times and with any keyword. According to exemplary implementations of the present invention, topics can be converted into keywords by parsing conversations into individual terms (keywords and/or phrases), and providing a weight for each term according to the usage and sentiment for the term.

Yet other exemplary embodiments of the present invention provide a system, method and apparatus utilizing sentiment analysis component of the NLP to implement algorithms combined with the screening to identify and mark conversations found according to a topic and/or a sentiment. According to exemplary implementations of the present invention, a default sentiment continuum can be positive, negative, and neutral. Sentiment(s) can customizable according to various spectra of descriptive characteristics such as delight to horror, satisfied to unsatisfied, and many others. The sentiment analysis, according to an exemplary implementation of the present invention, identifies at least one of emotions, such as sarcasm, anger, and any other measurable sentiment.

Yet other exemplary embodiments of the present invention provide a system, method and apparatus associating geo-location with content according to the readership in a designated market area, and plotting the geo-location information on a map (for example, further providing features for point-and-click). The map with the associated geo-location information, according to an exemplary implementation of the present invention, can be viewed globally, nationally and regionally. An exemplary implementation of the present invention provides for drilling down to individual conversations and their sentiment for the associated geo-location and content.

Yet other exemplary embodiments of the present invention provide a system, method and apparatus implementing knowledge assessment for the gathered content and/or information, where an NLP assesses sentiment and sentence construct to identify knowledge level of the writers of content or conversations, and further characterizes that knowledge (for example, as high, medium, or low) Implementations of the present invention identify key influential posters by their readership as well as level of knowledge.

Yet other exemplary embodiments of the present invention provide a system, method and apparatus implementing publishing content processed and analyzed by ALPACA to publish result of analysis in various user-customizable ways including but not limited to providing one or more modules to complement ALPACA or custom built for user-specific implementation(s).

Yet other exemplary embodiments and/or implementations of the present invention provide for indexing content on the Internet for finding patterns and trends that allow content to become predictive, where indexes can be influenced by AdSlider and/or WebDig to gain information that also influence the indexes with unique information.

Exemplary implementations of the present invention provide a computer implemented system, method, and/or apparatus providing at least one of the following content indexes: (1) a reputation strength index that includes a composite index comprising awareness and support of a brand (support including reputation, promise, and vision associated with the brand), (2) an awareness and support index comprising a composite index of sentiment and momentum, and (3) an emerging concept index comprising a composite index of intensity and momentum.

Further, various exemplary embodiments and/or implementations of the present invention provide a computer implemented method, systems and/or apparatus for content syndication tracking, semantic knowledge assessment, sentiment index, site influence index, social media impact index, social media comment identification and parsing, multi-source social media context and sentiment content serving, multi-source social media context and sentiment content tracking, stream-based sentiment classification, relational comparison of broadcast closed caption comments based on geographic distribution, geographic sentiment index, influencer index, queriable neutral network of aggregated social media data by demographic profile, social sentiment search and sentiment search frequency calculator.

BRIEF DESCRIPTION OF THE DRAWINGS

The above and other exemplary features, aspects and advantages of the present invention will become more apparent from the following detailed description of certain exemplary embodiments thereof when taken in conjunction with the accompanying drawings in which:

FIGS. 3-20 are diagrams of computer-generated screenshot that illustrate exemplary implementations of social cognition platform, according to a method, system and apparatus of the present invention.

Throughout the drawings, like reference numerals will be understood to refer to like elements, features and structures.

DETAILED DESCRIPTION OF EXEMPLARY EMBODIMENTS

Figure 1:
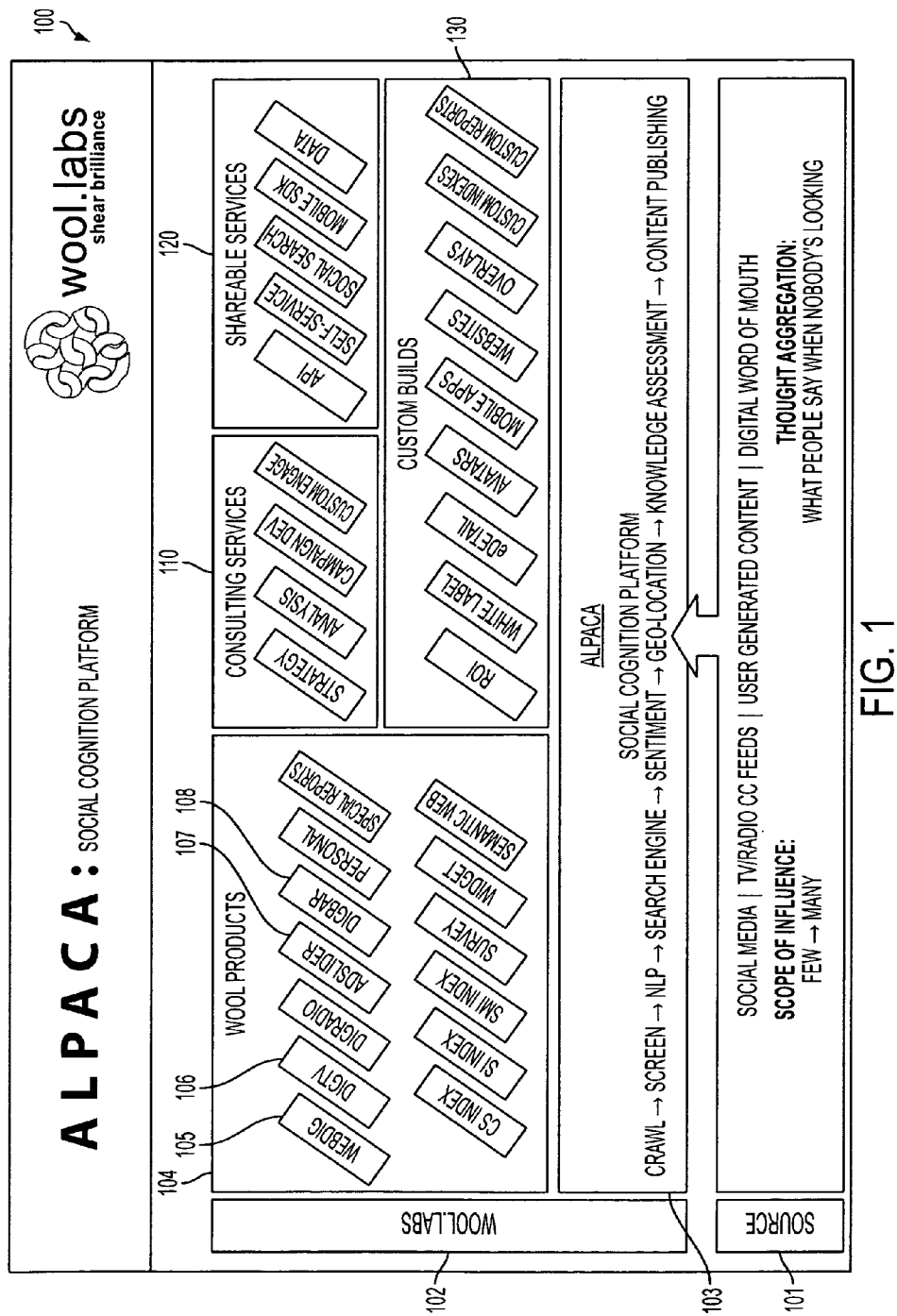
FIG. 1 is a block diagram that includes ALPACA, the social cognition platform, implemented according to an exemplary a method, system and apparatus of the present invention.

The matters exemplified in this description are provided to assist in a comprehensive understanding of exemplary embodiments of the present invention described with reference to the accompanying drawing figures. Accordingly, those of ordinary skill in the art will recognize that various changes and modifications of the exemplary embodiments described herein can be made without departing from the scope and spirit of the present invention. Also, descriptions of well-known functions and constructions are omitted for clarity and conciseness. Likewise, certain naming conventions, labels and terms as used in the context of the present disclosure are, as would be understood by skilled artisans, non-limiting and provided only for illustrative purposes to facilitate understanding of certain exemplary implementations of the embodiments of the present invention.

Exemplary embodiments of the present invention provide a computer implemented system, method and/or apparatus implementing business intelligence algorithms by utilizing content gathered from the Internet, television and radio stations, document repositories, and delivering computational results and data indicative of the intelligence via pre-configured and/or customized graphical user interfaces.

Exemplary embodiments of the present invention provide a computer implemented system, method and/or apparatus that discovers, aggregates, and parses an exhaustive source of digital text-based and/or audio content. Exemplary implementations provide at least the benefit of utilizing pre-configured algorithms and spiders without requiring RSS feeds, gathering and reporting entire universe of relevant content, fully trainable artificial intelligence natural language processing to enhance accuracy, understanding of sentiment ranges (fear, joy, pride, sarcasm, etc.), tracking the delta of sentiment over selected time periods, fully accessing specific verbatim, conversation threads and sources, and delivery of fully customizable dashboards or datasets.

Exemplary embodiments of the present invention implement a multi-layered process to speed up the process for indexing and categorizing Web sites by type and/or topic. An exemplary embodiment of the present invention provides a computer implemented system, method and/or apparatus that constantly crawls the Web for new social media sites which then move to a permanent index updated regularly (for example, weekly), separates Websites by topic(s) and type(s), crawls for Websites with germane topics to keywords and relevant comments, and stores the relevant comments and relationships.

Exemplary embodiments and/or implementations of the present invention provide a system, method and/or apparatus providing numerous advantages and/or benefits over conventional systems. For example, exemplary implementations of the present invention provide for adding new sites to the index on a regular basis (for example, daily), by de-coupling the process of indexing sites and comments across the whole Internet simultaneously, and thus overcoming deficiencies of conventional systems that do not provide for daily indexing.

Exemplary implementations of the present invention provide a system, method and/or apparatus having the benefit of storing Websites according to a topic to easily identify the Websites as a potential source of comments for a given search. Further, exemplary implementations of the present invention provide a system, method and apparatus having the benefit of generating inter-day sentiment indexes by determining the most active Websites on a particular topic and then searching the top Websites.

Exemplary embodiments of the present invention provide a computer implement system, method and/or apparatus for business intelligence that runs across all media and data sources, organizes content by topic and/or keywords, analyses a full sentiment spectrum, and proactively capture data from the entire internet.

Figure 2:
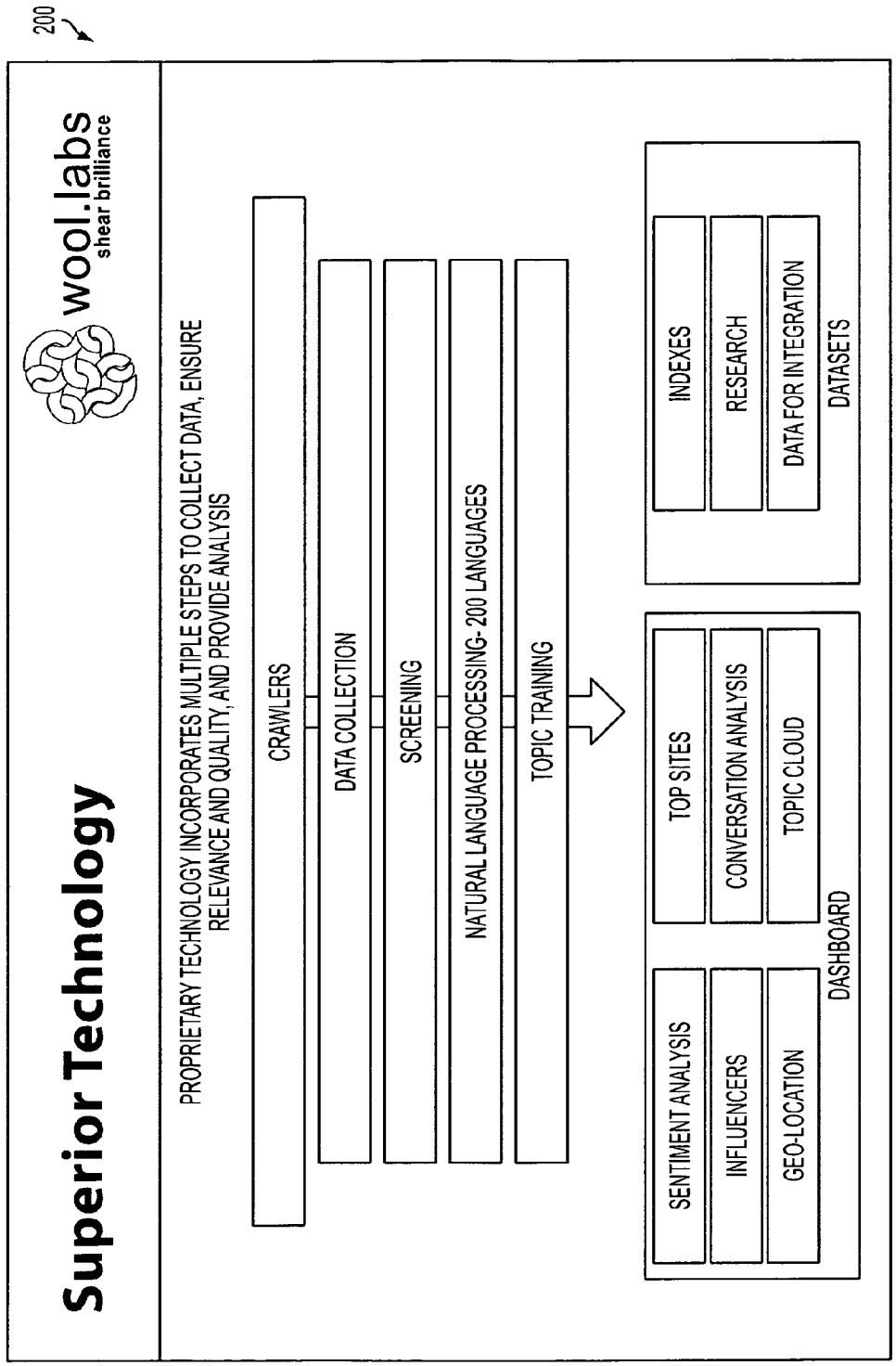
FIG. 2 is a flow diagram that illustrates a social cognition platform, according to an exemplary method, system and apparatus of the present invention.

FIGS. 1 and 2 are block diagrams that include a computer implemented system, method and apparatus 100, 200 according to an exemplary embodiment of the present invention providing social cognition technology platform 102, 103, namely "ALPACA" to dig deep into dialogue data to uncover core insights and emerging trends to inform strategy, change behavior and drive new business opportunities. ALPACA 103 gathers information from various sources 101 (such as social media, user generated content, digital word of mouth, etc.), provides a platform that processes and presents the gathered information via a number of complementary modules 104, 110, 120, 130, thus, providing a system, method and apparatus for allowing entities to view the information for emerging trends, change behavior and drive new business opportunities.

An exemplary embodiment of the present invention provides a computer implemented system, method and apparatus 200, as shown in FIG. 2, for incorporating multiple steps to collect data, ensure relevance and quality, and provide computerized data analysis. For example, Web crawlers, executed via a computer server, collect data from the entire Internet, screen the data, execute natural language processing of the data, and execute topic training based on the data. Thereafter, the data is provided by a server to a graphical user interface dashboard executing sentiment analysis, influence analysis, geo-location analysis, top-site ranking, conversation analysis and topic cloud analysis. In addition, datasets are maintained, for example on non-transient computer-readable medium such as solid state memory, magnetic or laser-readable medium, executing indexing, researching, and data integration.

Exemplary embodiments of the present invention utilizing ALPACA provide unique features for business intelligence platforms that process various media sources 101 including digital, TV and Radio. ALPACA utilizes highly advanced, search technologies, artificial intelligence, complex natural language processors, topical verbatim databases and a unique social search engine to extract, analyze and report on the impact of social opinion on an entity. Embodiments utilizing ALPACA compile, screen, geo-locate, and analyze natural language conversations and correlates them to topical reporting activity on TV, Radio, and the Web. ALPACA can report activity in over 200 languages.

ALPACA, according to exemplary embodiments of the present invention includes multiple, complementary modules that process information across a continuum—from raw data to clean and targeted reporting to generate a more complete analysis of the attitudes and trends that can impact business.

Exemplary embodiments of the present invention provide user interfaces that allow an entity (for example, organizations, marketers, etc.) to utilize ALPACA to evaluate information specific to that entity's business parameters, including analyzing and organizing the information relevant to the entity with respect to its competitors. Exemplary embodiments of the present invention provide a system, method and apparatus to seek, gather and organize information from multiple sources, such as, the Internet, to determine how to extract it from multiple sources and process it in a way that presents meaningful results for an entity.

Exemplary implementations of the present invention provide a computer implemented system, method and apparatus for processing and analyzing social media conversations, via one or more modules, communicating with ALPACA. An exemplary implementation of such a module is WebDig, which according to an exemplary implementation of the present invention, implements next-generation business intelligence that finds, aggregates, and interprets an exhaustive source of digital conversational and word-of-mouth ("WOM") content, in conjunction with ALPACA.

Figure 3:
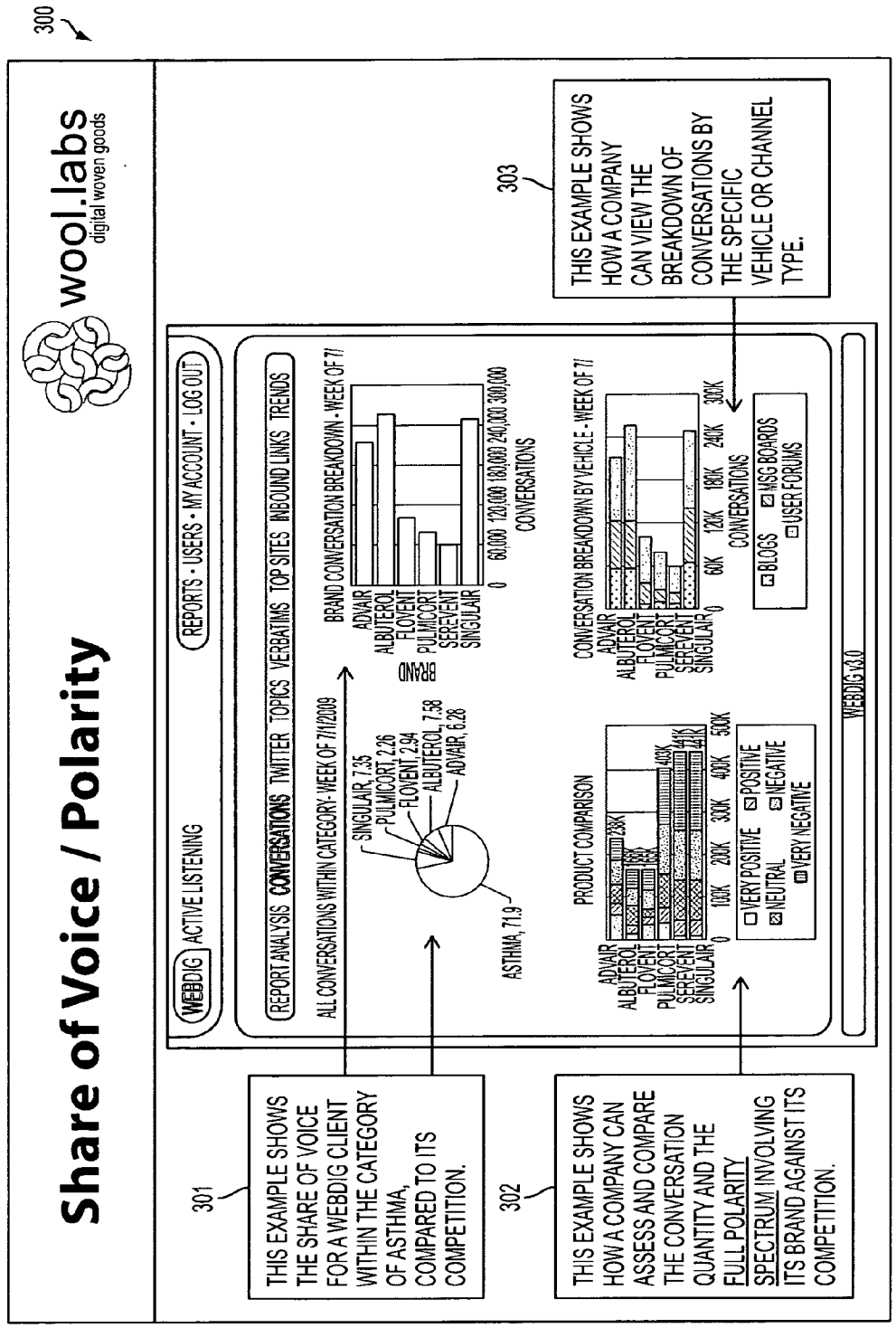

According to exemplary embodiments of the present invention, as shown in FIG. 3, a WebDig module implements a computerized system, method and apparatus 300 comprising a graphical user interface ("GUI") which in the example of FIG. 3 illustrates a share of voice for a WebDig user within the category of Asthma 301, compared to its competitor based on the analysis of extracted information. Additionally, FIG. 3 exemplifies a GUI that shows how a company can assess and compare Internet conversations quantity and full sentiment polarity spectrum involving one brand against another 302. Further, FIG. 3 exemplifies a GUI that shows how computational analysis provide information within the GUI that includes breakdowns of conversations by a specific category, topic, vehicle, or channel 303.

Figure 4:
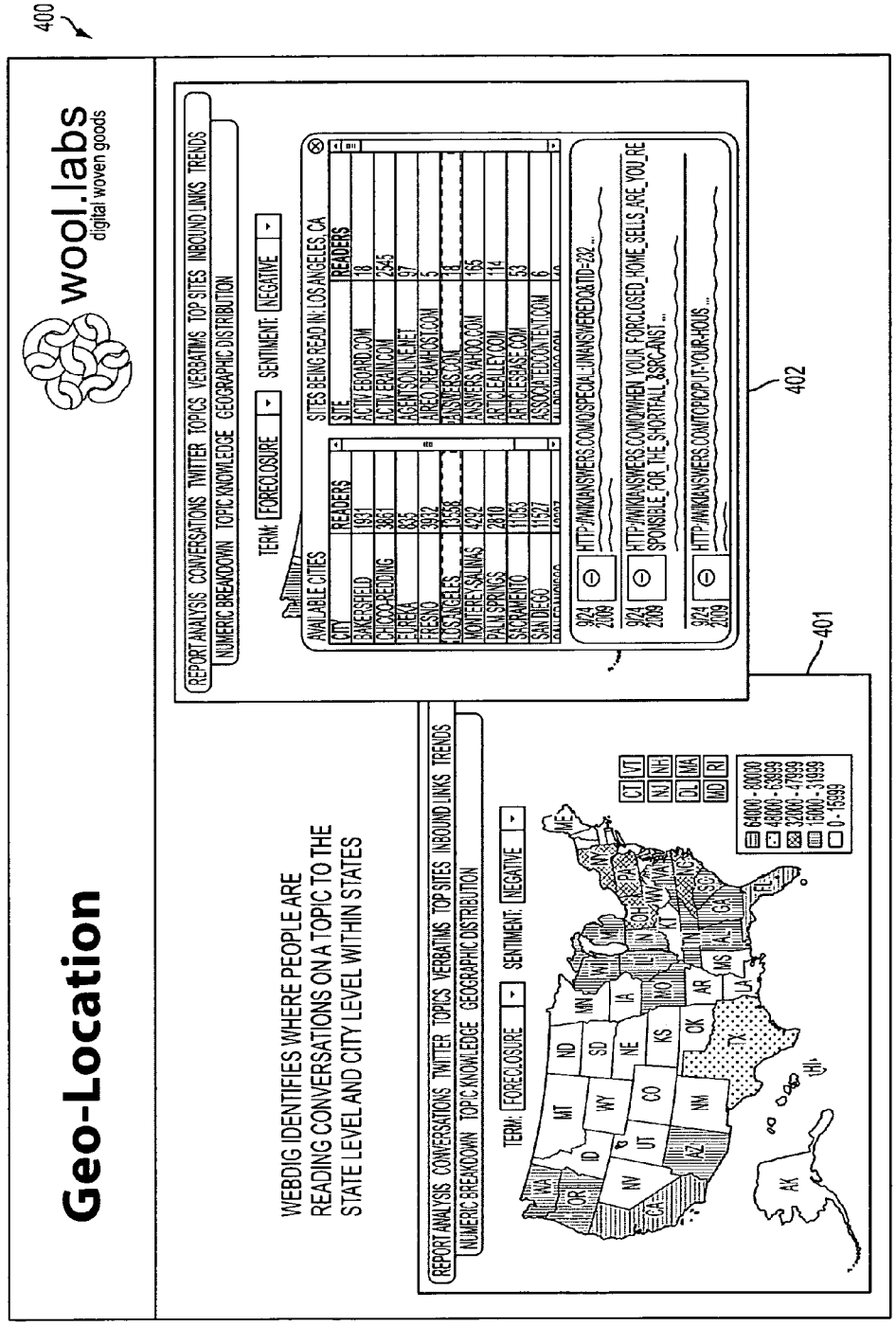

According to exemplary embodiments of the present invention, as shown in FIG. 4, WebDig implements computerized system, method and apparatus providing a GUI 400 presenting results of data mining and analysis which identifies where people are reading conversations on a topic by geographic parameters, such as state level and city level within states 401, 402.

Figure 5:
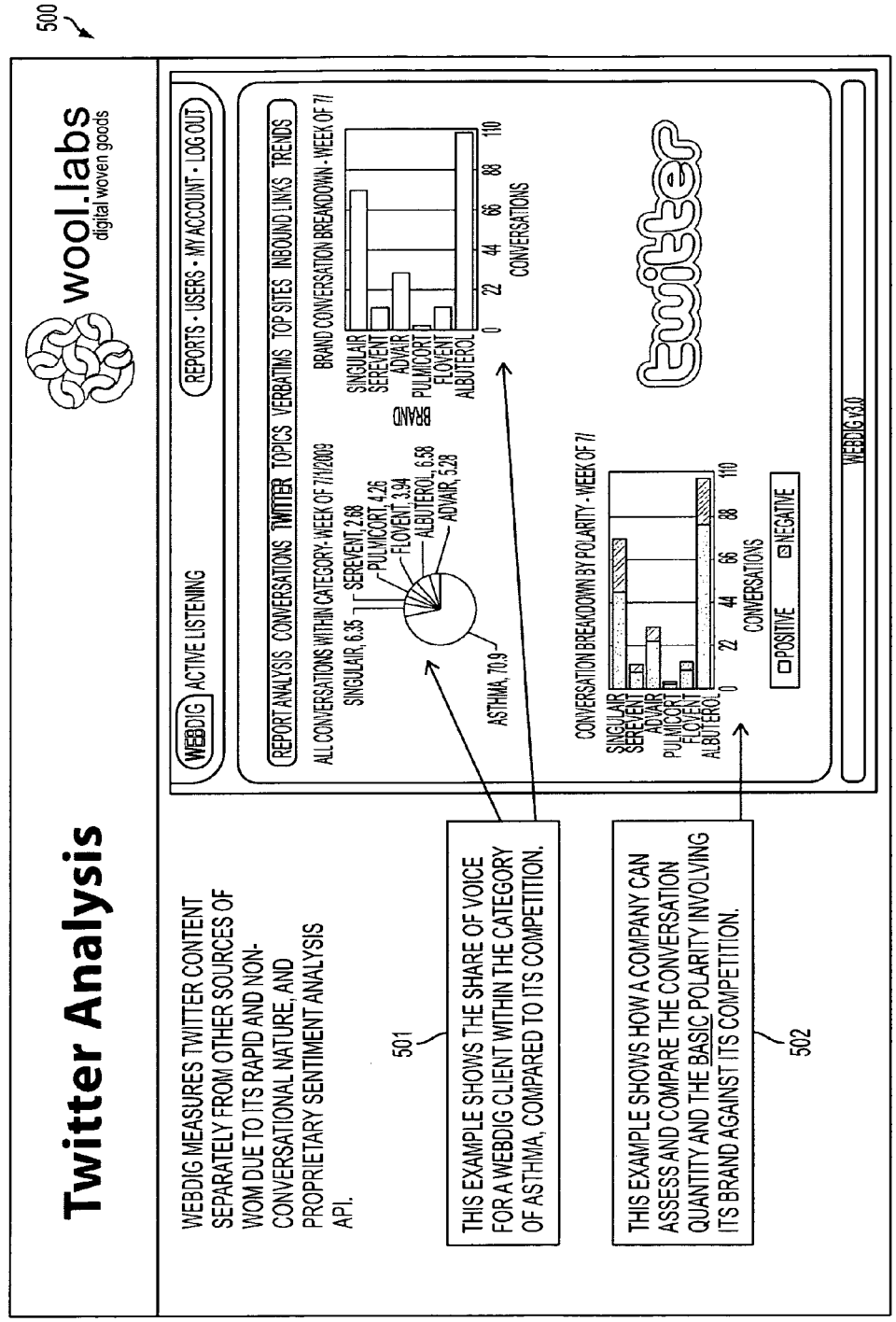

According to exemplary embodiments of the present invention, as shown in as FIG. 5, WebDig implements a computerized system, method and apparatus providing a GUI 500 presenting results of data mining and analysis which measures social media (for example Twitter, . . . ) content separately from other sources of word-of-mouth due to its rapid nature 501 and provides a sentiment analysis involving an entity and its competitors 502.

According to exemplary embodiments of the present invention, as shown in FIG. 6, WebDig implements a computerized system, method and apparatus providing a GUI 600 presenting results of data mining and analysis which identifies words most frequently used within conversations based on specific sub-topics and sentiments. For example, WebDig provides a GUI showing word clouds broken out by sub-topics and positive-negative conversations 601, and showing a verbatim search based on the word "price" within positive user generated content for "Singulair" 602.

Figure 7:
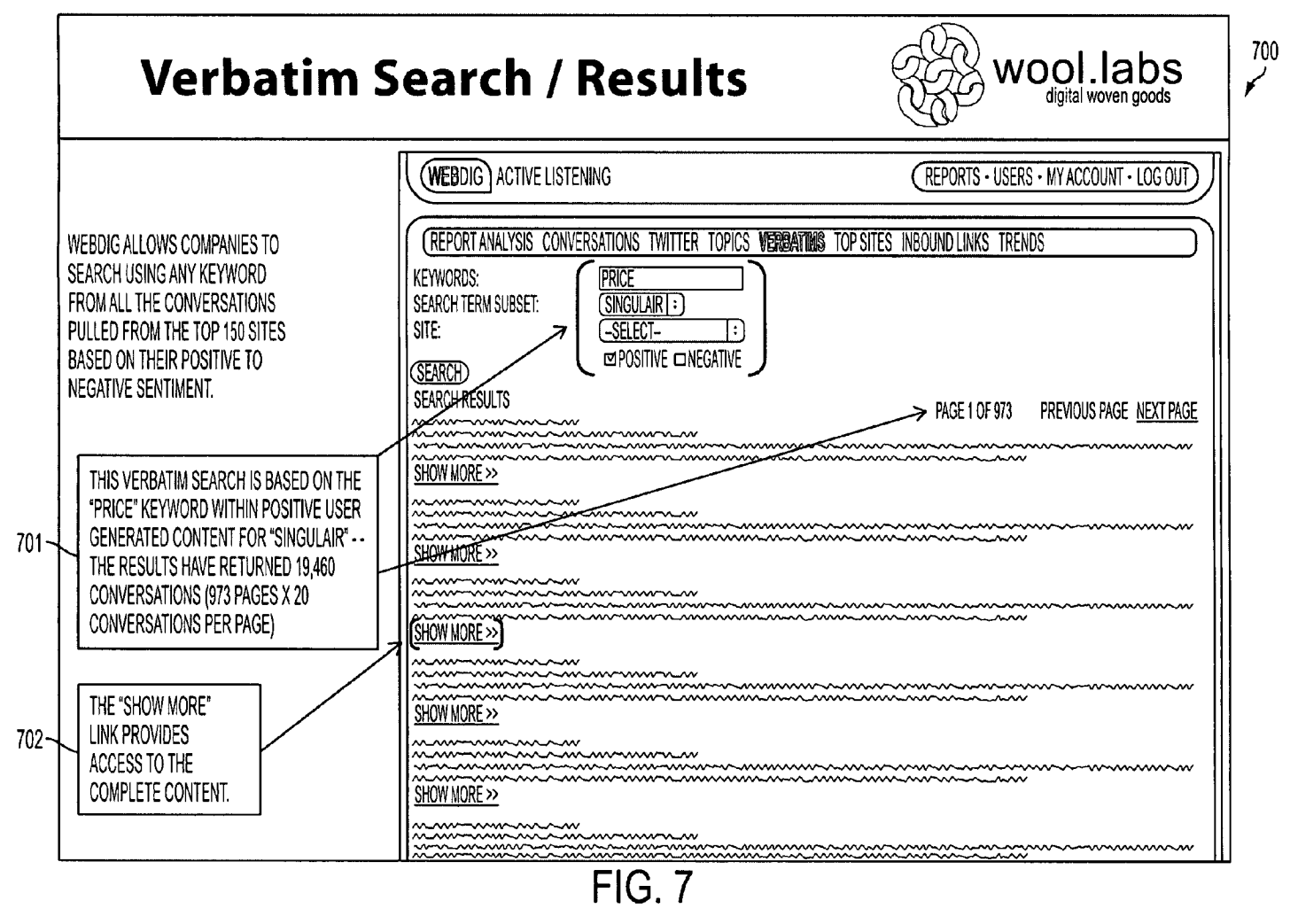

According to exemplary embodiments of the present invention, as shown in FIG. 7, WebDig implements a computerized system, method and apparatus providing a GUI 700 presenting results of a computerized search (using a keyword) within the conversations pulled from Websites based on various criteria (for example, positive or negative sentiments). For example, the verbatim search 701 is based on "price" keyword within positive user generated content for "Singulair," where the results have returned 19,460 conversations (973×20) conversations per page). The "show more" link 702 included within GUI 700 provides access to the complete content of each individual item resulting from the search 701.

Figure 8:
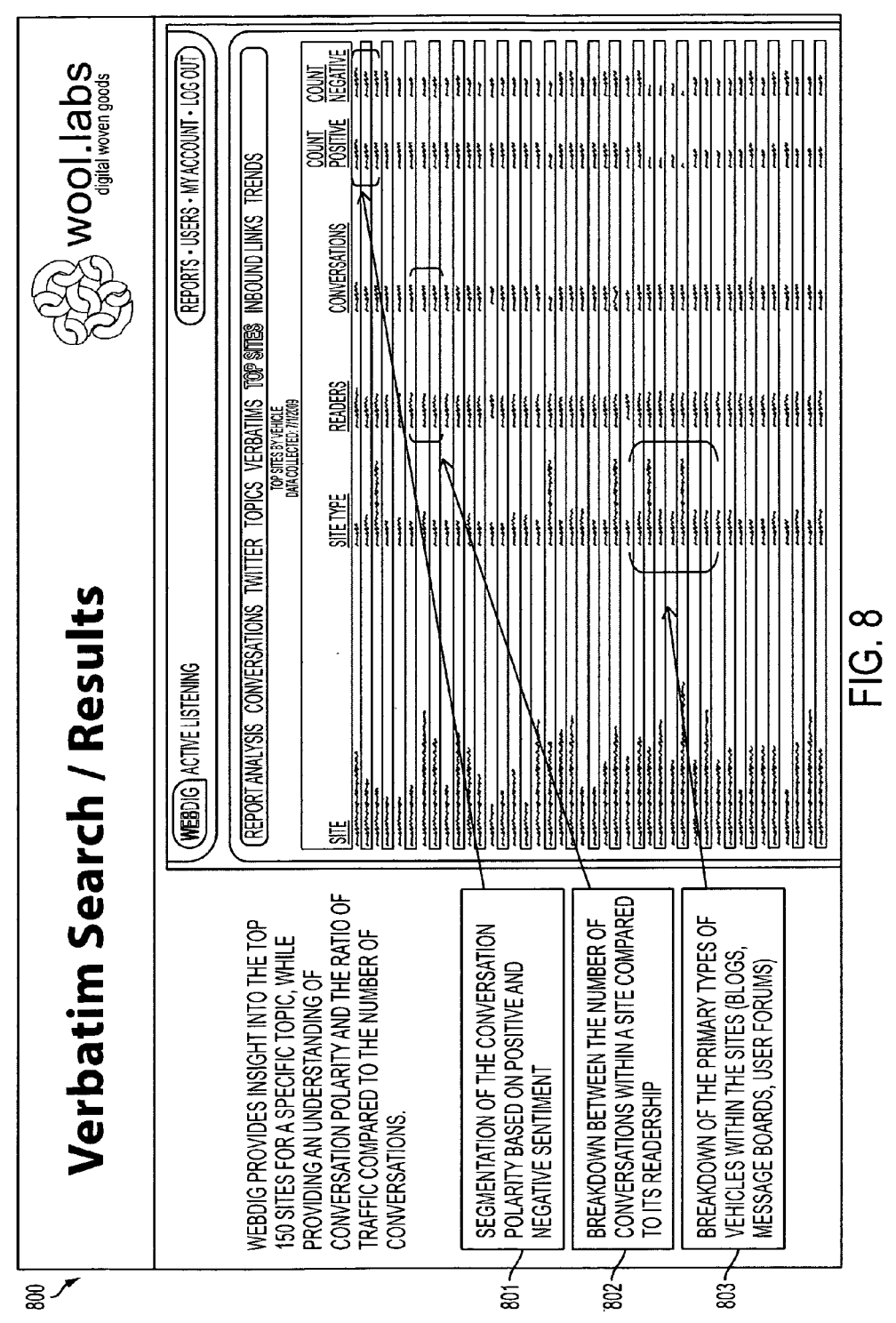

According to exemplary embodiments of the present invention, as shown in FIG. 8, WebDig implements a computerized system, method and apparatus providing a GUI 800 presenting results of data mining and analysis which provides insight into Websites for a specific topic, while providing an understanding of conversation sentiment polarity and ratio of traffic compared to the number of conversations. The GUI 800 presents results of computational analysis that includes evaluation of a segmentation of the conversation polarity based on positive and negative sentiment 801, a breakdown between the number of conversations within a Website compared to its readership 802, and a breakdown of the primary types of vehicles within Web sites (blogs, message boards, user forums, etc) 803.

Figure 9:
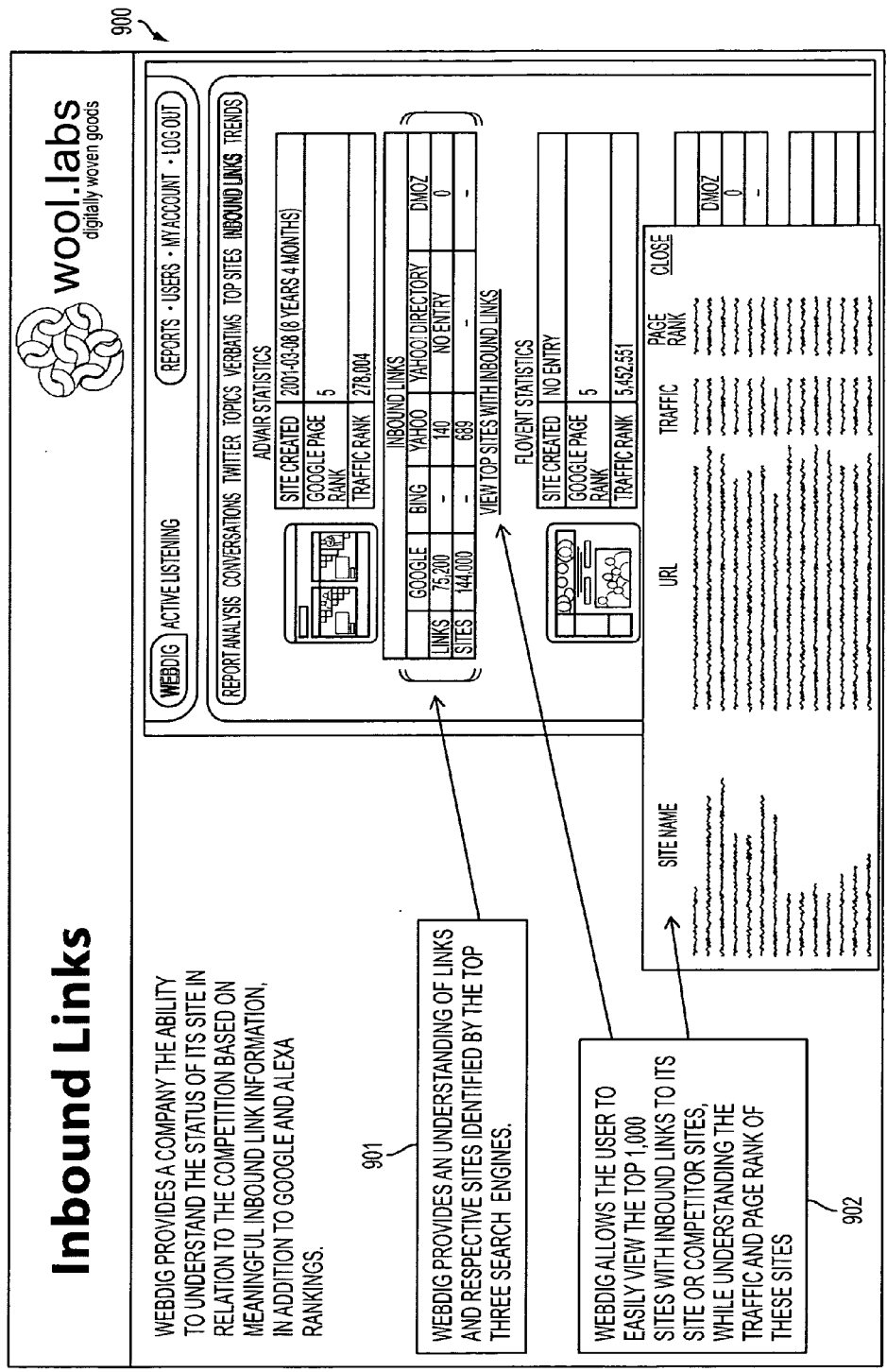

According to exemplary embodiments of the present invention, as shown in FIG. 9, WebDig implements a computerized system, method and apparatus providing a GUI 900 presenting results of data mining and analysis which shows the status of an entity's Website in relation to its competitors based on meaningful inbound link information, in addition to rankings by other Websites (such as Google, Yahoo, Bing, and/or Alexa) 901, 902.

Figure 10:
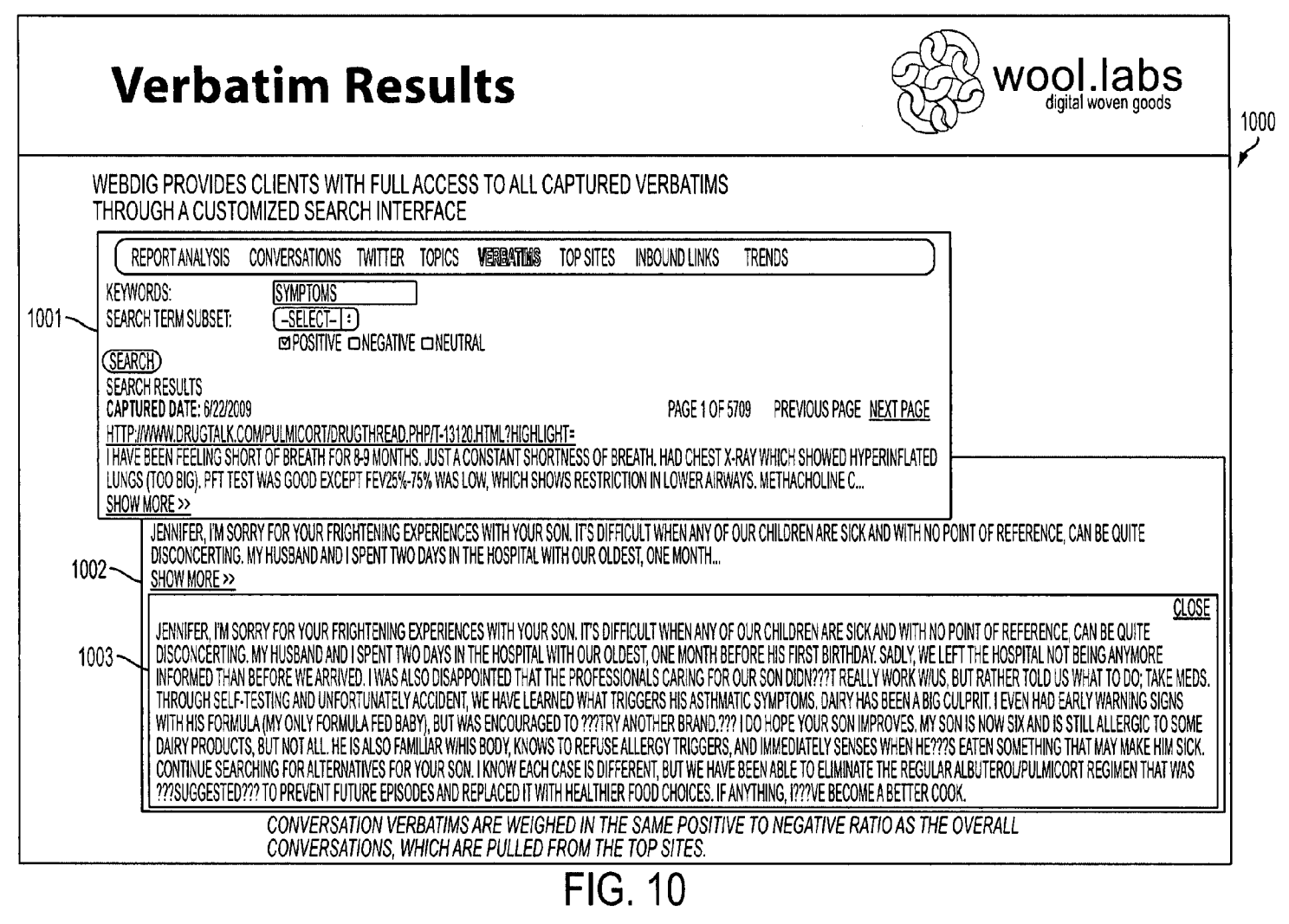

According to exemplary embodiments of the present invention, as shown in FIG. 10, WebDig implements a computerized system, method and apparatus providing GUIs 1000 presenting results of data mining and analysis which provide entities with full access to captured verbatims through a customized search interface 1001, where conversation verbatims are weighted in a sentiment ratio (positive to negative) as the overall conversations, which are pulled from top Websites 1002, 1003.

Figure 11:
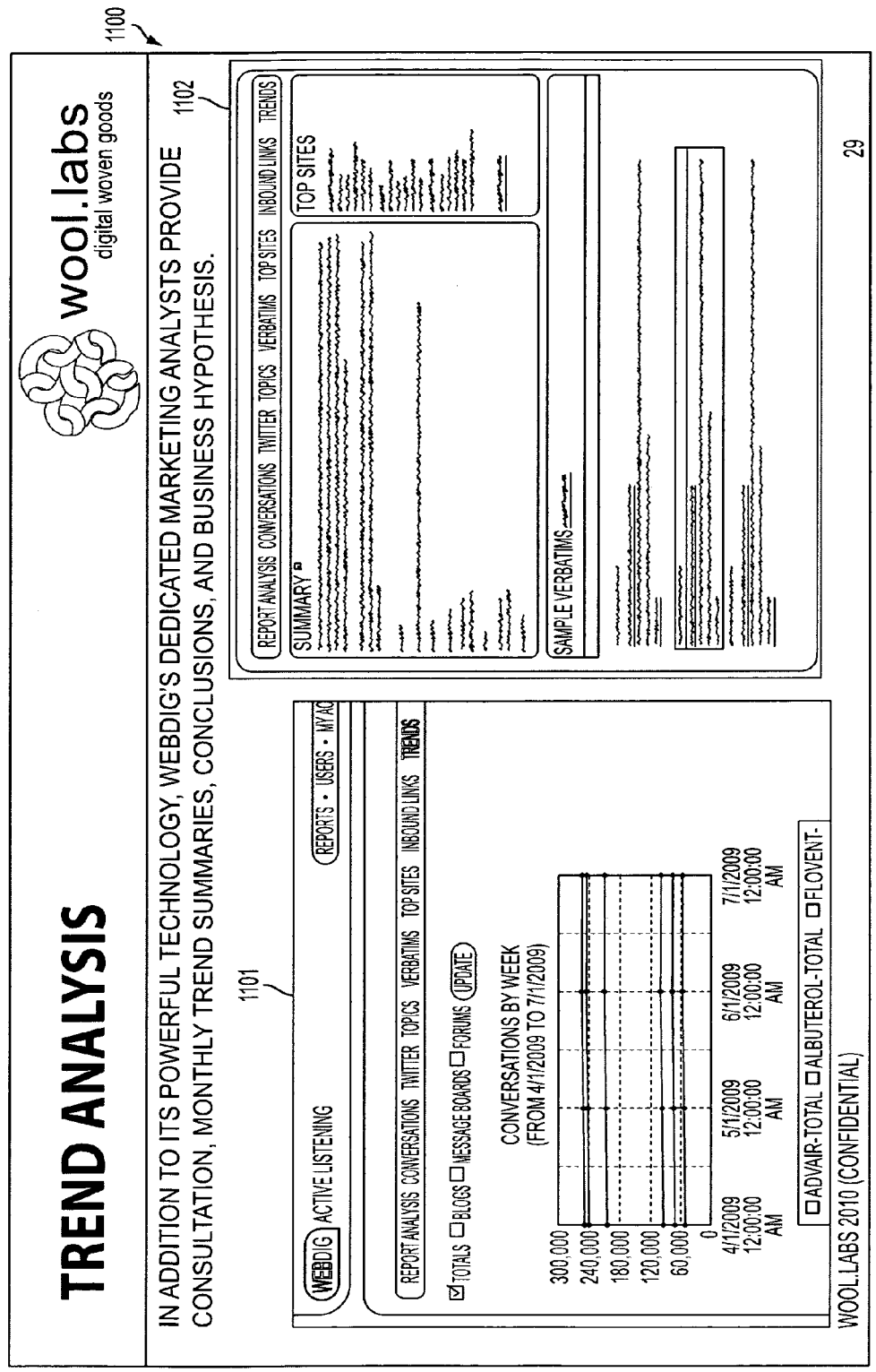

According to exemplary embodiments of the present invention as shown in FIG. 11, WebDig implements a computerized system, method and apparatus providing a GUI 1100 presenting results of data mining and analysis which provide marketing analysis for consultation, monthly trend summaries, conclusions and business hypothesis 1101, 1102.

WebDig, according to exemplary embodiments of the present invention, provides for a method, system and apparatus by which analysts can identify paths (such as xpaths explained below) to comment containers in social media sites with a single click thus generating a custom parser for each social media website. For example, exemplary embodiments of the present invention provide for at least the following features:

1. Identifying Blog Comments—identifying the programming structure that the comments sit in; each blog or forum has its own way of identifying how comment data appears in the blog.
2. Mapping Xpath to Comments—providing an XPath to comments, where an Xpath is the extraction string that is dynamically generated to identify how to find comments, the date of the post, IP address, user name, location.
3. An Xpath is used to extract the comments and associated data (such as but not limited to date, IP, username, location).
4. Xpaths for each Website are saved for fast extraction.

Exemplary embodiments of the present invention provide for conceptualizing a Website as a spreadsheet table (such as an MS Excel table), which would tell the parser to go to the $4^{th}$ row of the $5^{th}$ cell. The parsing process comprises getting to the comment and pulling it into the database.

Exemplary embodiments of the present invention provide for a process that identifies and differentiates social media (SM) comments on a Website allowing to access specific content on a page rather than the whole pages as typically done by a search engine. For example, the process identifies and marks just SM for extraction without having to bring in content that then has to removed, making this process more efficient, and faster, and requiring less processing power and disk.

Exemplary embodiments of the present invention provide for cleanly extracting SM comments from individual web pages without pulling in ancillary content. For example, if an article contains SM comments, an exemplary implementation of the present invention will retrieve just the SM comments not the entire article or advertising, etc. This allows the exemplary system of the present invention to retrieve and maintain more efficient and relevant data.

FIGS. 22-26 are block diagrams illustrating exemplary embodiments of the present invention providing a computer implemented system, method and apparatus 2200 for finding, aggregating, and interpreting source of Internet content 2211, 2202, 2215 (from digital conversations, word-of-mouth, blogs, messages, user forums, content) and providing the processed content to WebDig customers/entities 2201, 2203. In the example, of FIG. 22, application server 2208 executes an implementation of the WebDig, launches a Web crawler to find content and/or conversations from the Internet (searching all blogs, message boards, user forums for topics, and/or concepts). The server 2208 processes the gathered content and executes site gathering, xpathing (in conjunction with a screener), site crawling to identify conversations, and conversation gathering. The server 2208 stores the processed content in a database storage unit 2209 (WebDig Development & Conversation Database) in conjunction with a Database Server 2210. The application server 2208 executes natural language processing and sentiment assignment on the processed content 2214. An administrator 2202 (WebDig Screener) further processes the content by executing sentiment screening and xpathing functions of the content utilizing a computing device 2211 that communicates with the application server 2208 over a communication network (ie., Wide Area Network, Internet 2213, etc.). The content, upon being processed by the WebDig Screener is moved to a production system including a production application server 2205, a production database 2206, and a production database server 2207, for providing the content to a WebDig Customer 2201 on a dashboard 2203 executed on a computer implemented graphical user interface, via a communication network (Internet 2212). The production application server 2205 receives content from application server 2208. Then, production application server 2205 executes computer implemented instruction(s) to process and store conversations, top sites, indexes, topic clouds, sentiments, and/or trends upon the content data received 2207. Then, the production application server 2205 transmits conversation, top sites, index, topic cloud, sentiment and/or trend information, via the Internet, to a dashboard executing on at least one computer device, allowing a WebDig Customer to interact with the information via the computer device(s).

According to exemplary embodiments of the present invention, WebDig, for content gathered from the Internet, implements content tracking and syndication, semantic knowledge assessment, social media content identification and parsing, and relational comparison closed caption text to social media comments based on geographic distribution.

Content Tracking and Syndication

Figure 23:
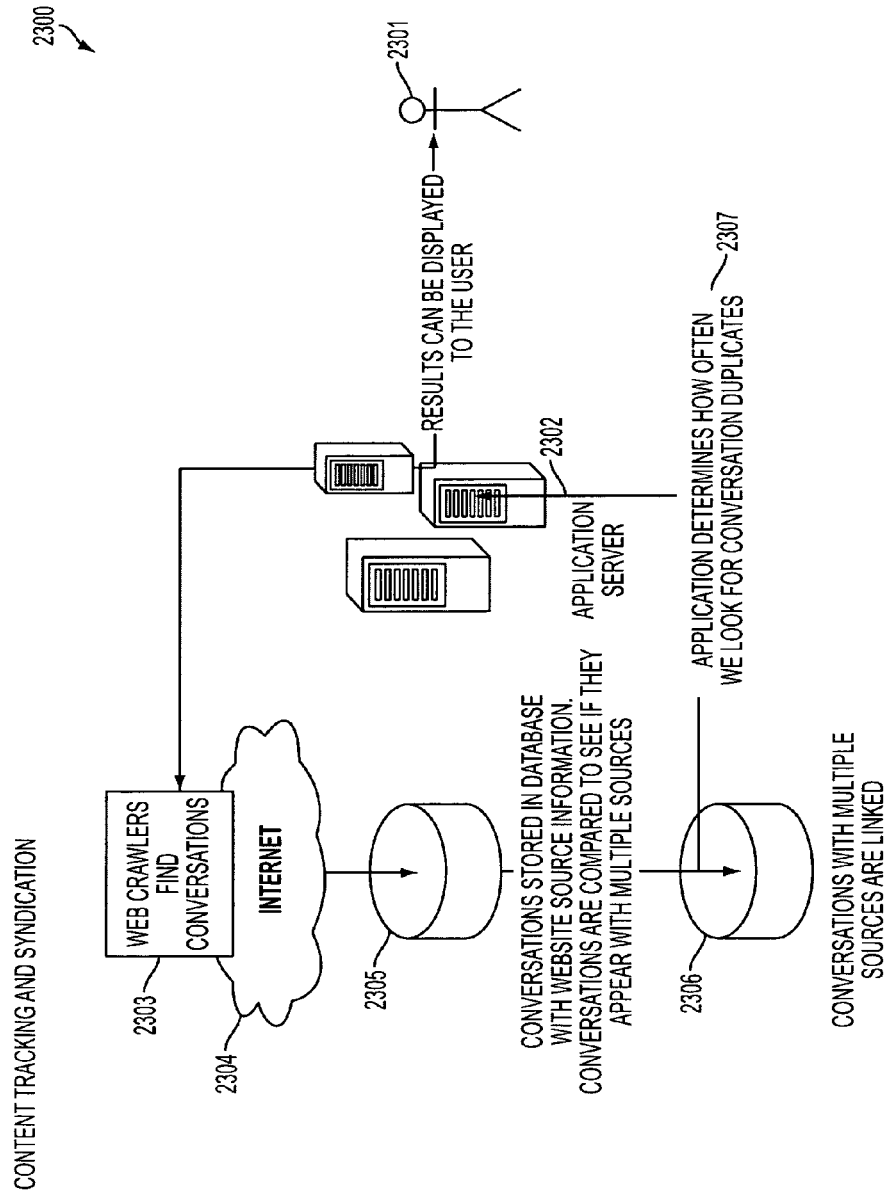

FIG. 23 illustrates an example of WebDig providing content tracking and syndication of content gathered over the Internet, according to an exemplary system, method and/or apparatus of the present invention. WebDig provides Content Tracking and Syndication for tracking specific comments and/or ideas from their point of origin (specific site and user) and mapping them on a site by site basis as they are syndicated across other social media.

For example, an application server 2302 launches one or more Web crawlers 2303 to find conversations on a communication network (for example, Internet 2304), stores the found conversations in a database 2305 with Web site source information and compares the conversations to evaluate if the conversations appear with multiple sources, and links conversations with multiple sources 2306. The application server 2302 determines how often conversation duplicates are checked for 2307.

Semantic Knowledge Assessment

Figure 24:
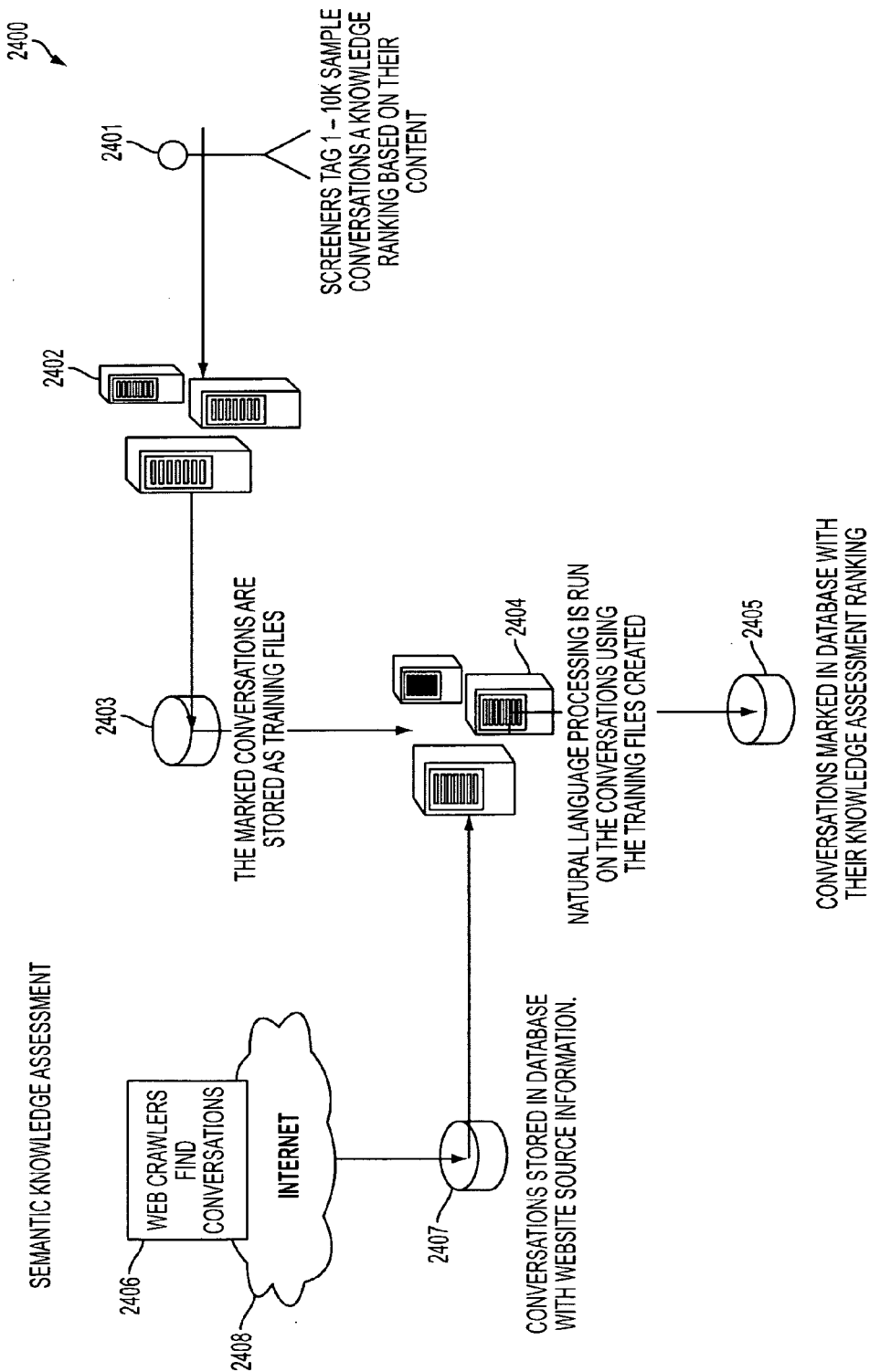

FIG. 24 illustrates an example of WebDig providing a semantic knowledge assessment of content gathered over the Internet, according to an exemplary system, method and/or apparatus of the present invention 2400. WebDig, according to an exemplary embodiment of the present invention, provides semantic knowledge assessment that compares semantic knowledge derived from predefined statements of fact (for example, drug side effect profiles or brand messages) and compares and contrasts its findings with semantic knowledge derived from social user commentary to identify knowledge gaps, misrepresentations and non-factual claims, as well as determine factual social understanding and penetration of knowledge or specific ideas.

For example, a screener 2401, communicating with server 2402 via a graphical user interface, tags sample conversations and provides a knowledge ranking based on the convent of the conversation. The tagged/marked conversations 2403 are stored as training files. The server 2404 receives conversations stored in a database 2407 based on conversations found by the web crawler 2406. The server 2404 executes natural language processing 2404 on the conversations gathered by the Web crawler 2406 using the created training files 2403 and stores the conversations tagged/marked in a database with their knowledge assessment ranking 2405.

Social Media Content Identification and Parsing

Figure 25:
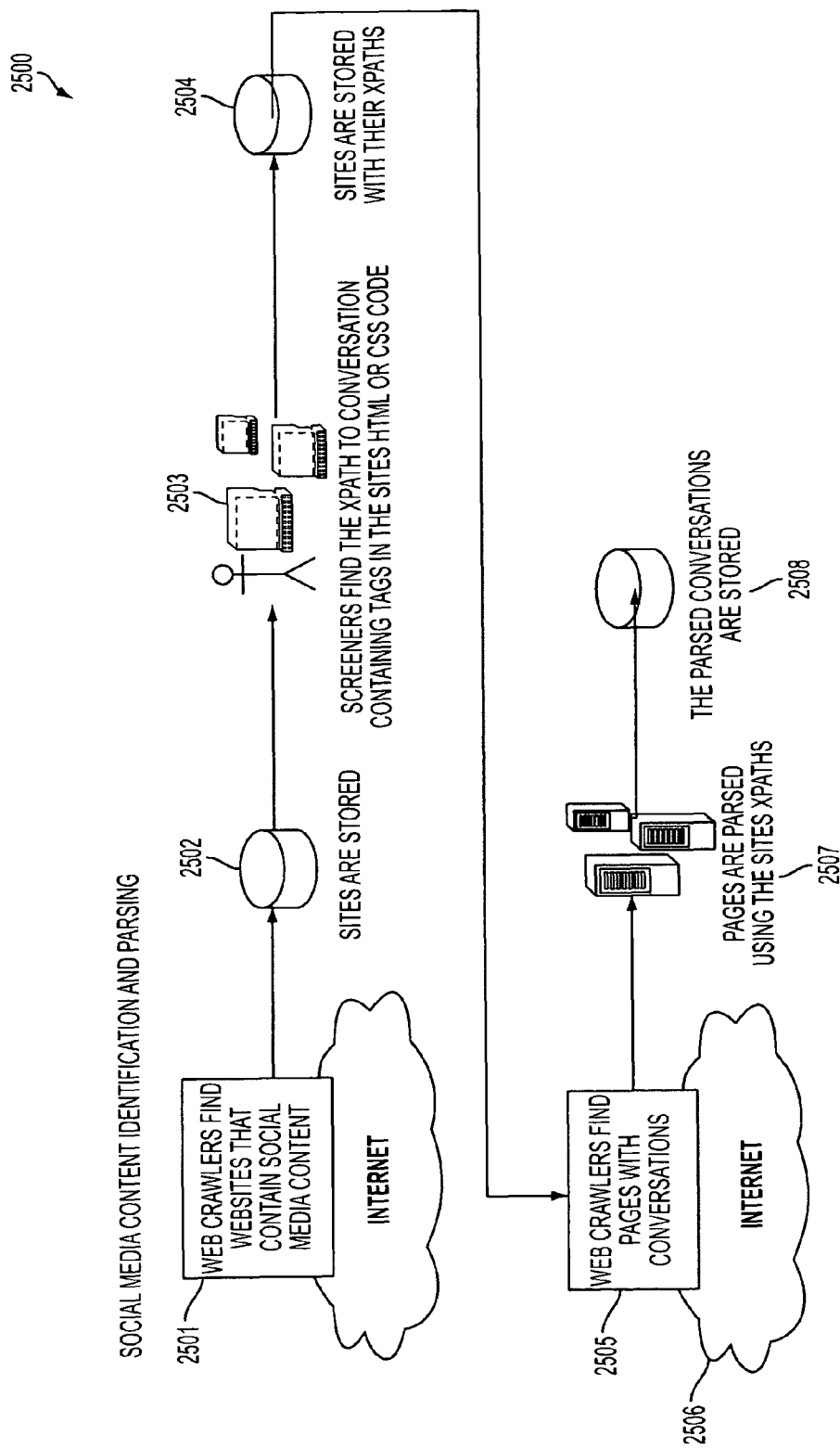

FIG. 25 illustrates an example of WebDig providing a social media content identification and parsing of content gathered over the Internet, according to an exemplary system, method and/or apparatus of the present invention 2500. WebDig, according to an exemplary embodiment of the present invention, executes a process for identifying and mapping xpaths to comment containers in a social media sites with a single click thus generating a custom parser for each social media website.

For example, after launching from a server, Web crawlers find Websites having social media content 2501 (for example, any content placed on the Internet by a user) and the found Websites are stored in a database 2502. Screeners, utilizing computer devices connected to the server according to exemplary embodiments of the present invention via the Internet, find the xpath to conversation containing tags in the Websites HTML or CSS code 2503. Websites are stored in a database 2504 with their xpaths. Then, a server, according to an exemplary embodiment of the present invention, launches Web crawlers to seek, find, identify and gather Webpages with conversations. The Webpages are parsed 2507 using the Website xpaths stored in the database 2504. The parsed conversations are stored in a database 2508.

Figure 26:
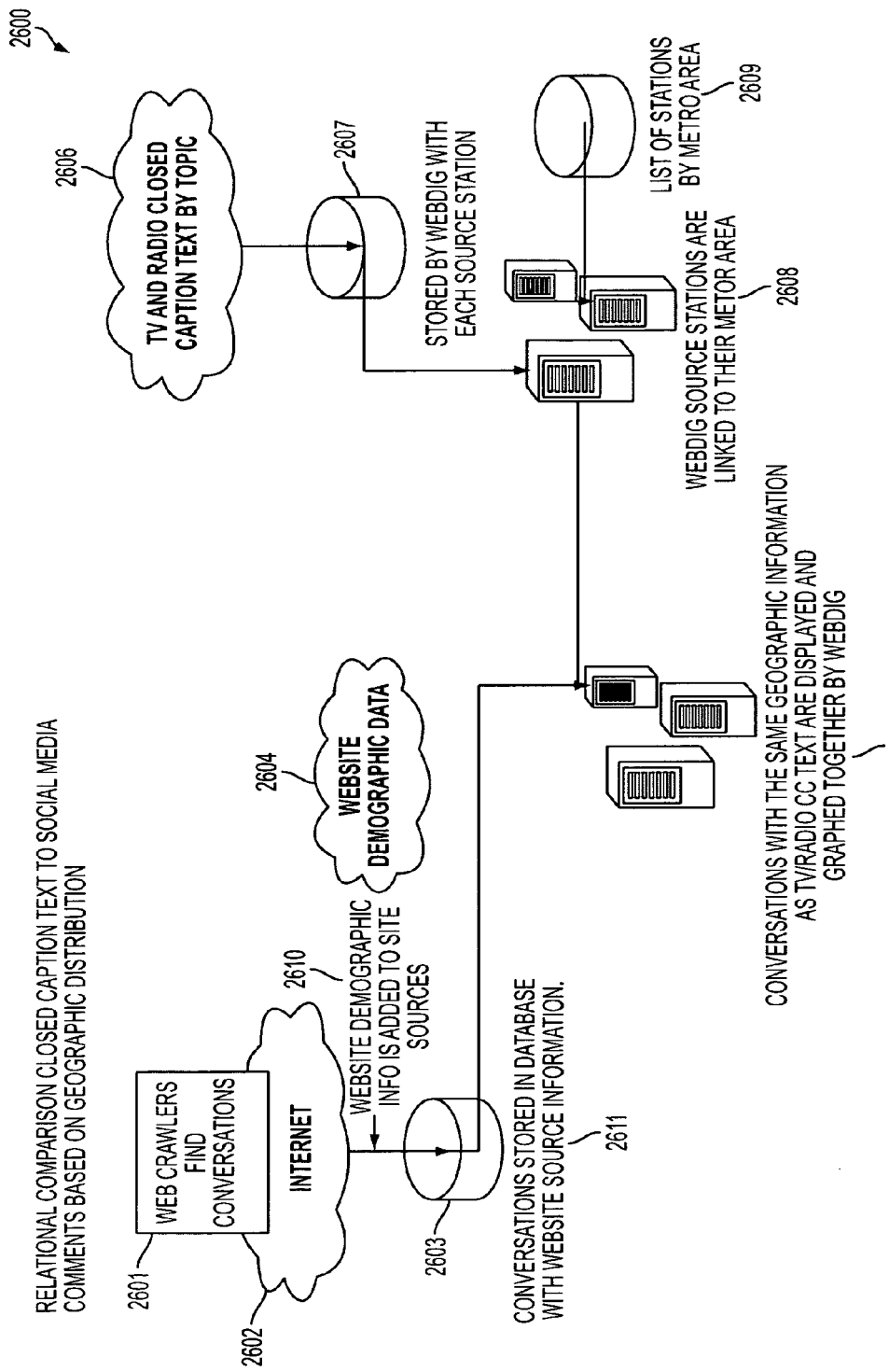

Relational Comparison of Television and/or Radio Closed Caption Text to Social Media Comments Based on Geographic Distribution FIG. 26 illustrates an example of WebDig providing a relational comparison of television and/or radio closed caption text to social media comments based on geographic distribution of content over the Internet, according to an exemplary system, method and/or apparatus of the present invention 2600. WebDig, according to an exemplary embodiment of the present invention, executes a process that captures and analyzes every available television station with a closed caption signal according to a natural language processor in the same way the natural language processor analyzes social media comments. In addition all television affiliate stations have a defined geographic reach. By mapping the reach of a station with the topic and sentiment that data is compared to readership of similar comments within social media and measure the response in the social sphere. Also, exemplary implementation of the present invention account for trends in social media that are then picked up and repeated in broadcast media.

For example, an exemplary server, according to an embodiment of the present invention, launches Web crawlers to find conversations and Web sites on the Internet 2601 2602. The server adds Web site demographic information to the Web site source information 2604 2610. Conversations are stored in the database 2603 with Website source information 2611. Further, a server implementing the WebDig module, finds and gathers television and/or radio closed caption text by topics 2606, and stores the each source station in a database 2607. The server links the WebDig source stations to their geographic metro area 2608 based on a list of stations stored in a database 2609 by metro area. WebDig combines the conversations stored in the database 2603 with the same geographic information as television and radio closed caption text, and graphs and displays the combined information together 2605.

Exemplary implementations of the present invention provide a computer implemented system, method and apparatus that aggregates content from various television and/or radio stations such as DigTV, via one or more module, communicating with ALPACA to monitor and report on the content, and combine the aggregated content with the content collected and processed by WebDig. DigTV tracks trending topics online that influence television content/coverage. Tracks television topics and how they translate to online conversations.

According to exemplary implementations of the present invention, DigTV provides a computer implemented system, method and/or apparatus that monitors raw footage from local and national broadcast networks, conducts a search for key words (either across all broadcast networks and geographies, or specific stations and cities), implements a multimedia player to clip the relevant broadcast segment and translate the audio into text and report on the effect that broadcast media has on/from a social sphere, and provides a graphical user interface to present various data sets in conjunction with television broadcast signals.

Figure 12:
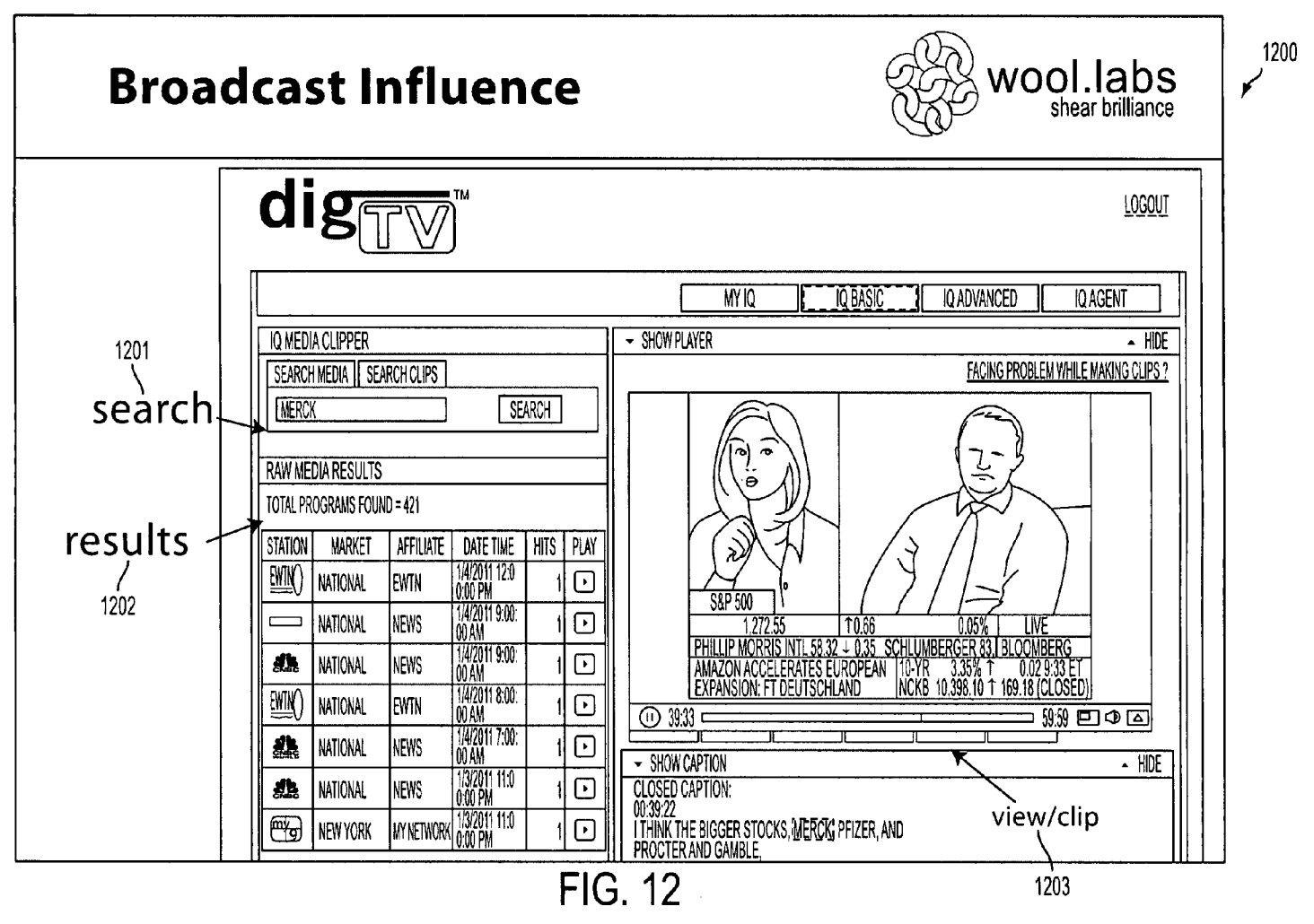

As shown in FIG. 12, an implementation of DigTV according to an exemplary embodiment of the preset invention provides a GUI 1200 that receives, from a user via an input device, a criteria "Merck" for searching content 1201, provides search results 1202 of television content relating to "Merck", and provides view/clip 1203 of television broadcasts relating to "Merck."

Figure 13:
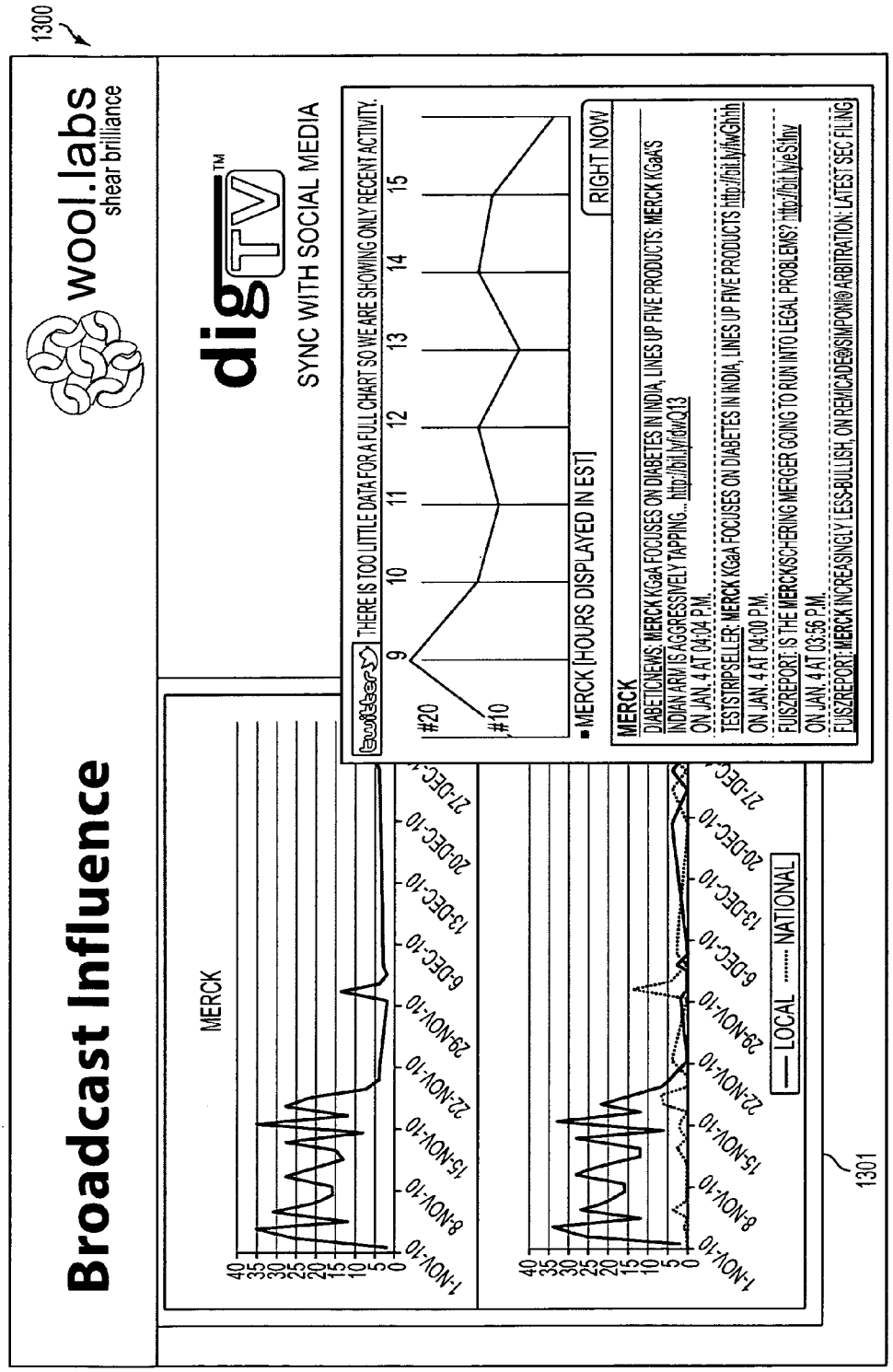

FIG. 13 illustrates DigTV according to an exemplary implementation of the present invention providing a GUI 1300 displaying graphical and textual reports 1300 providing results of data mining and analysis including synchronization of television content with social media.

Figure 14:
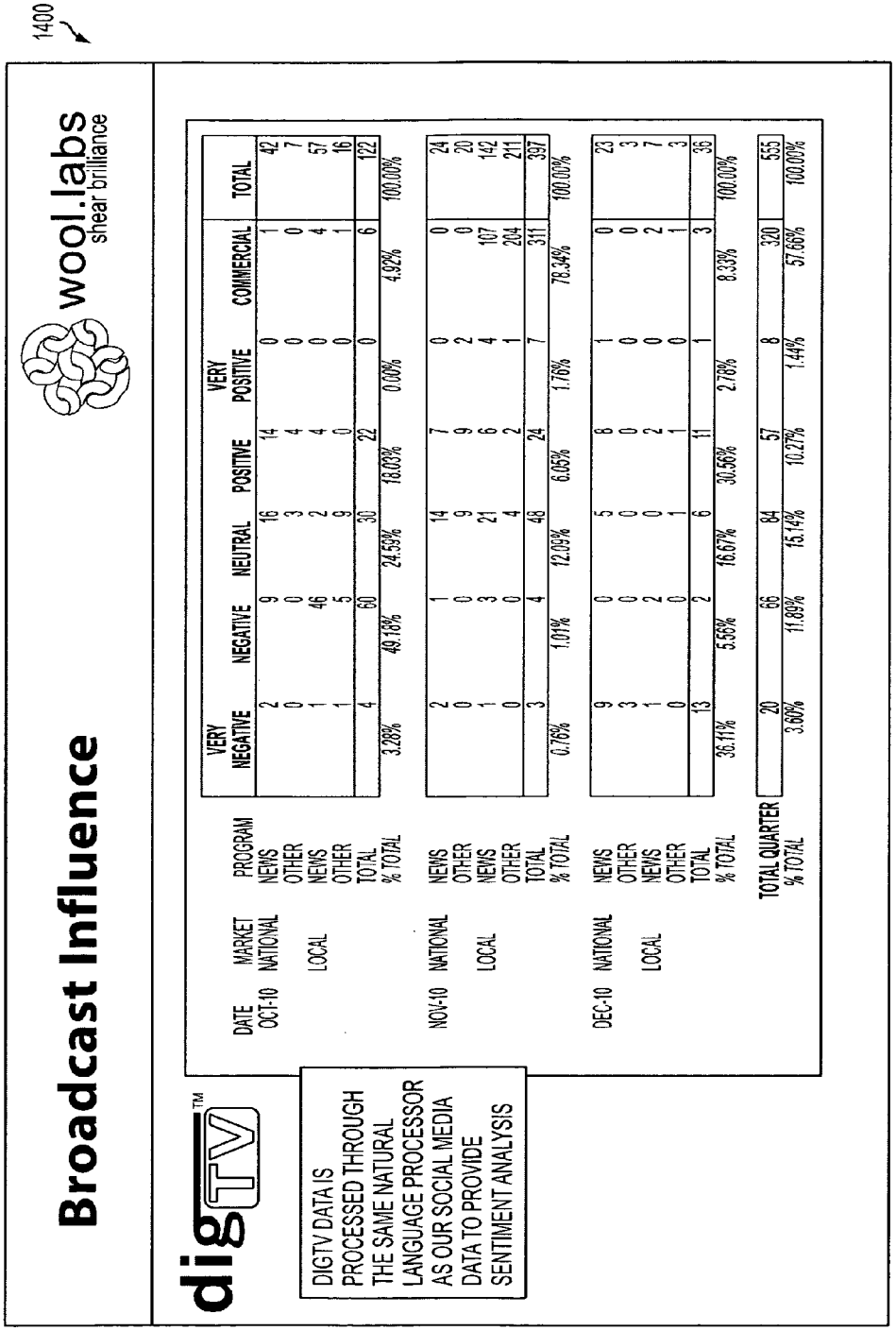

FIG. 14 illustrates DigTV according to an exemplary implementation of the present invention providing a GUI 1400 displaying a graphical and textual report 1400 providing results of sentiment analysis including data processing through a natural language processor.

Figure 15:
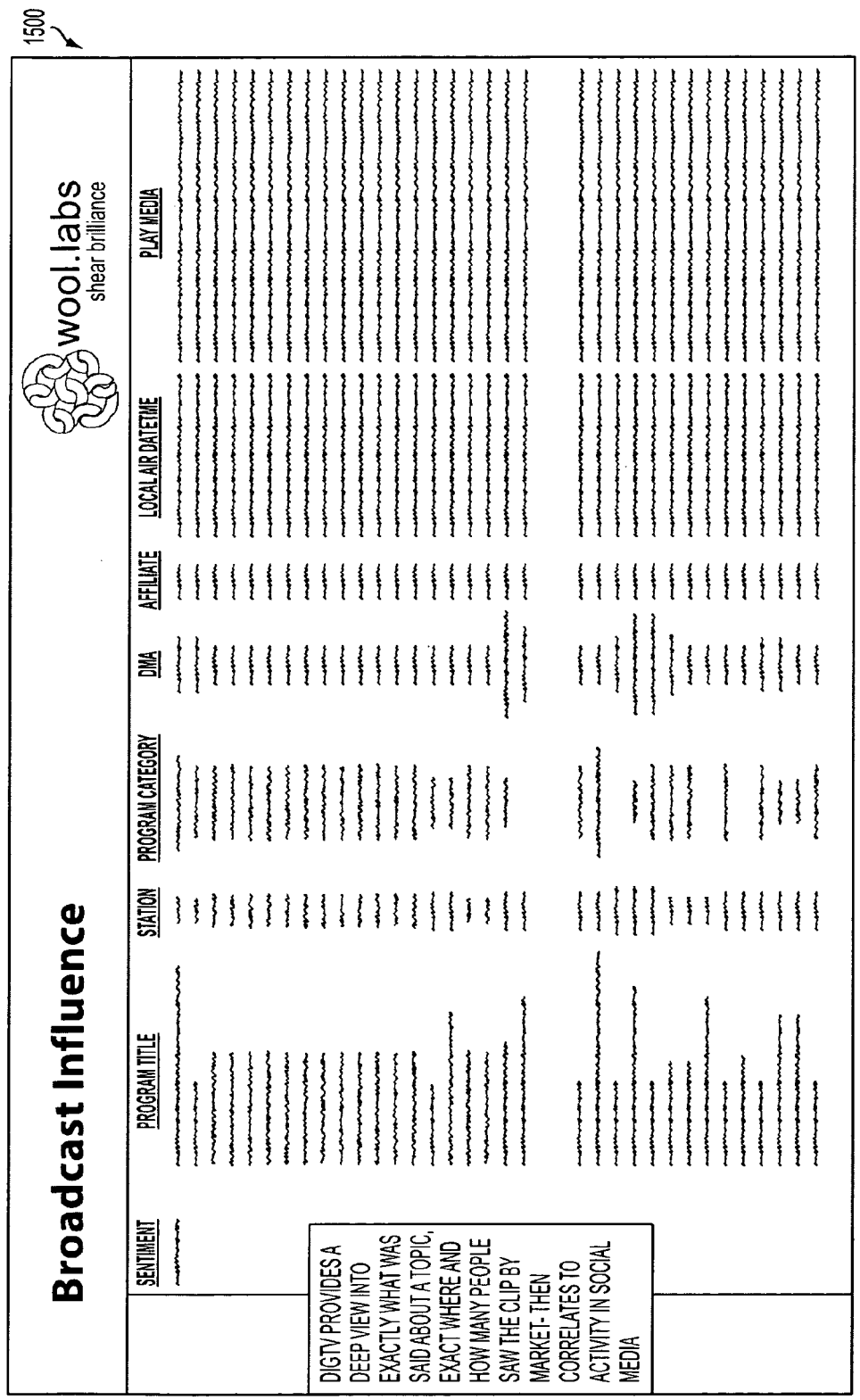
Figure 16:
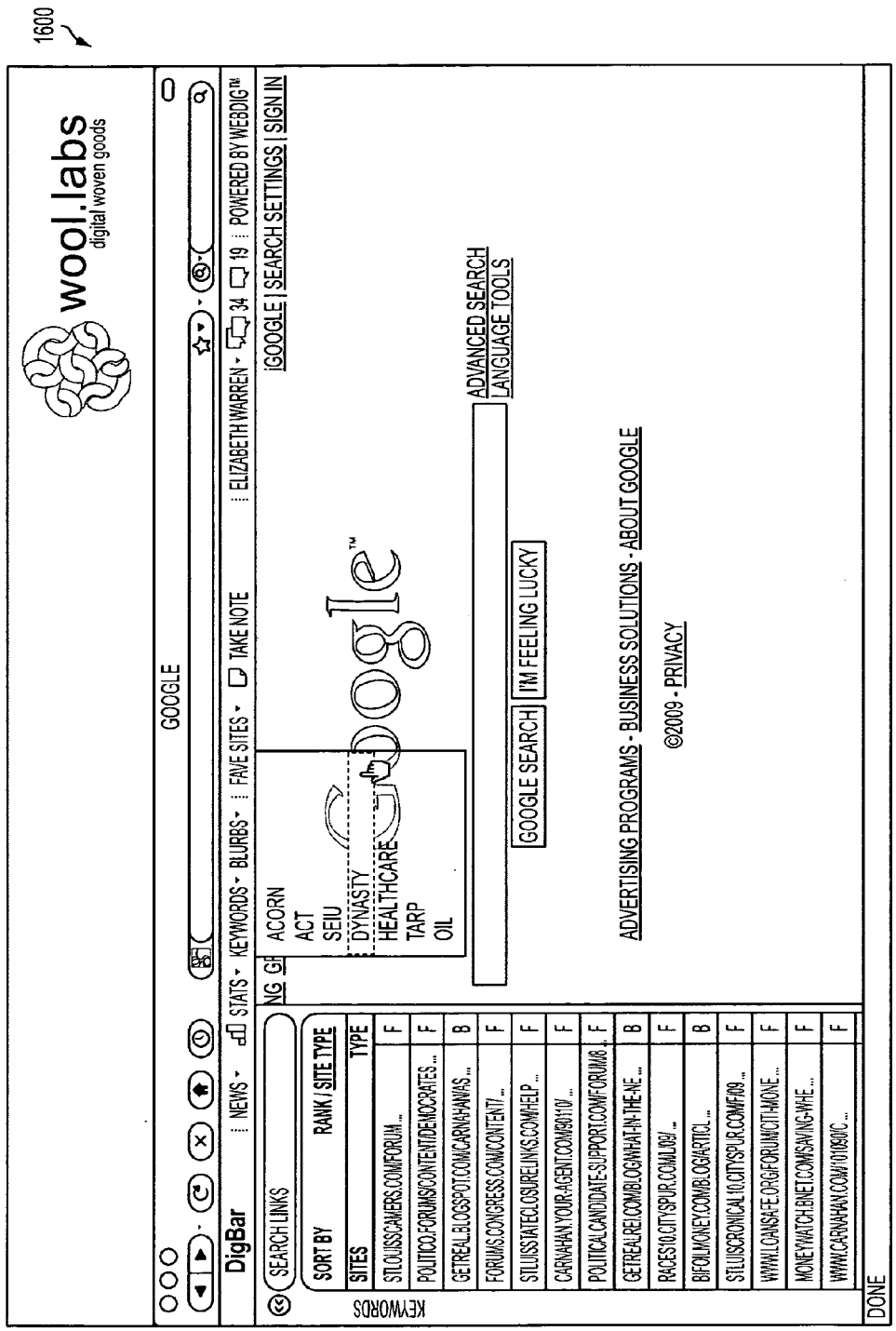
Figure 19:
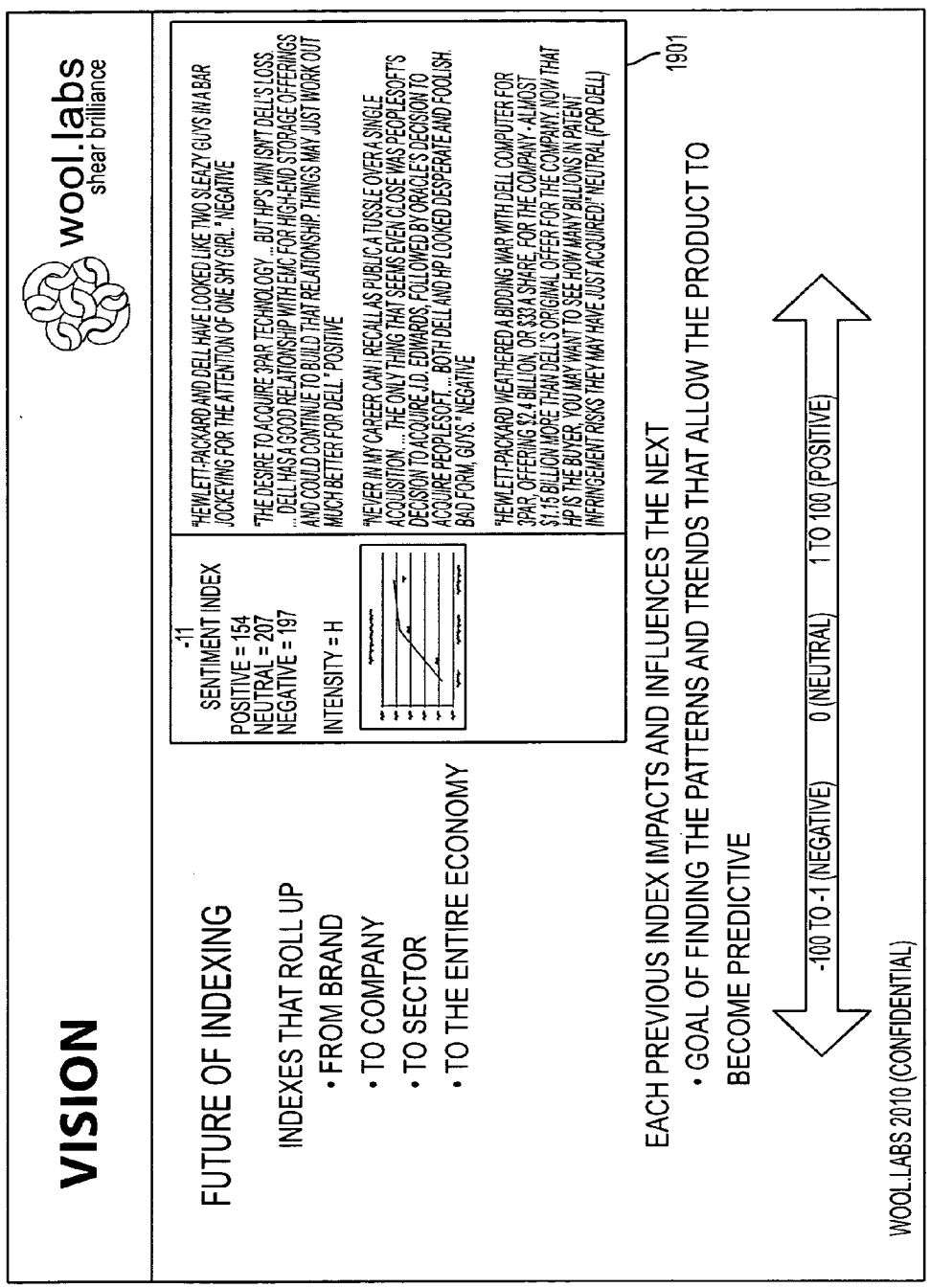
Figure 21:
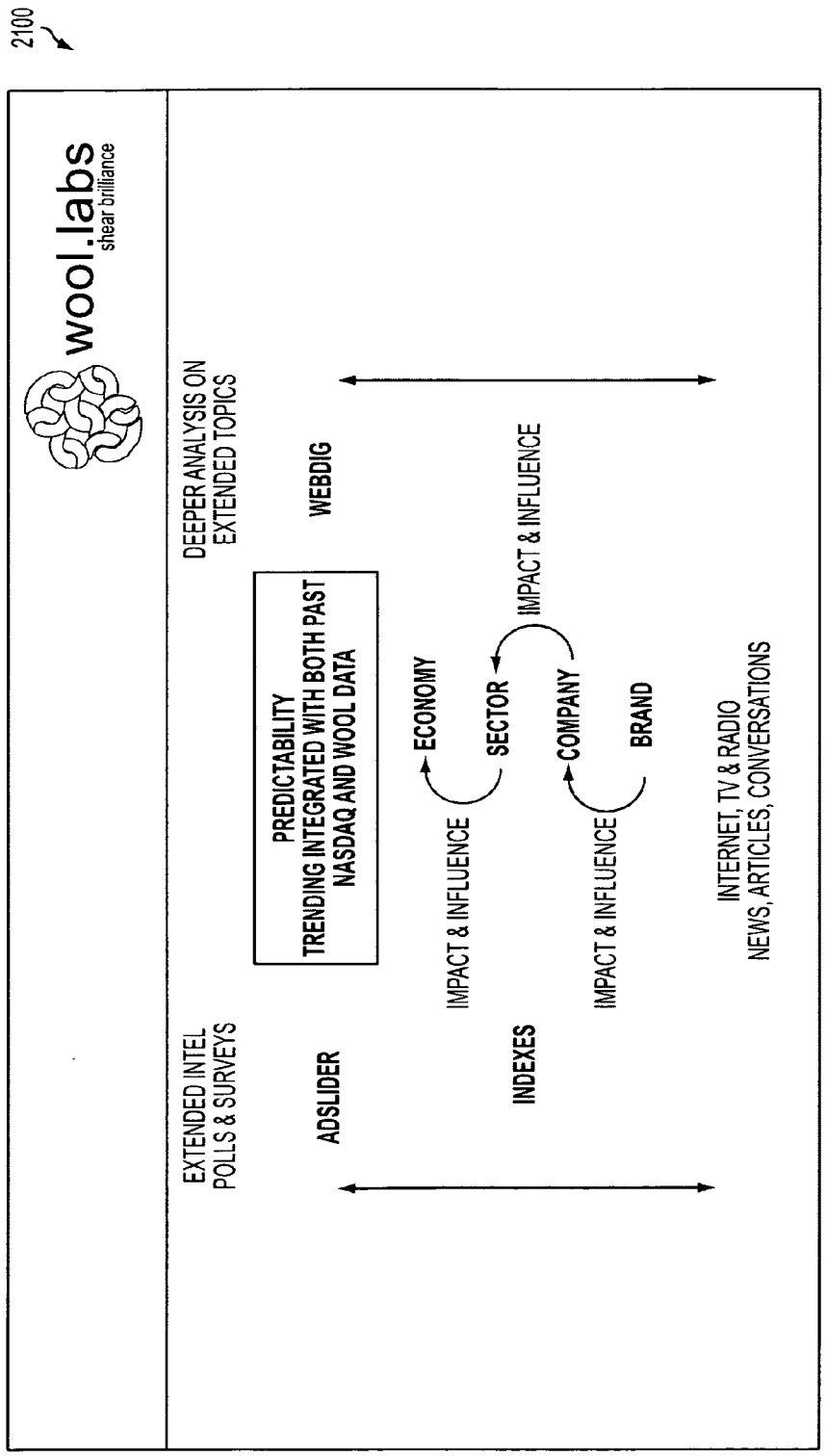
FIG. 21 is a diagram that illustrates an example of a social cognition platform, according to a method, system and apparatus of the present invention.
Figure 22:
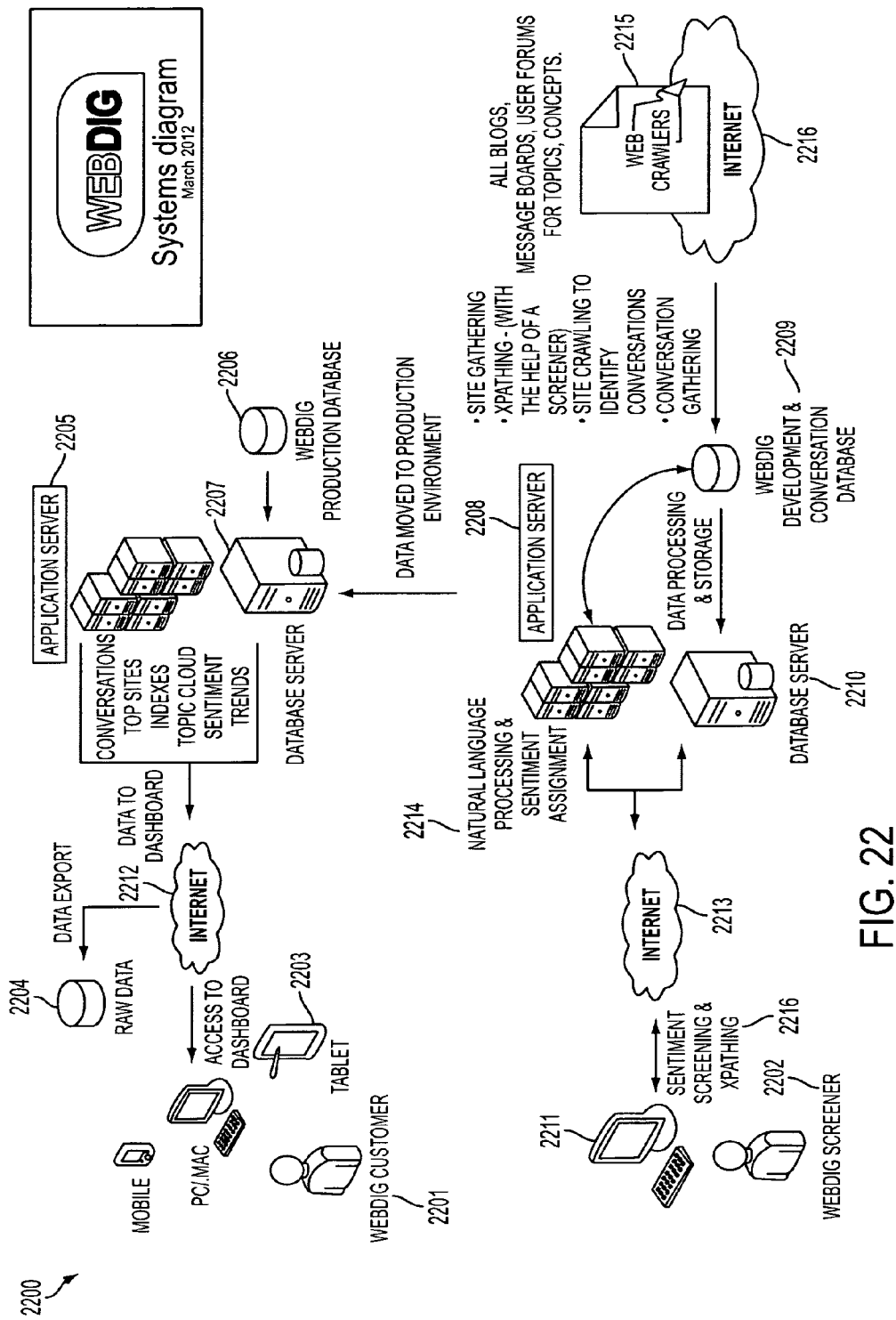
FIGS. 22-26 are flow diagrams that illustrate another example of a social cognition platform, according to a method, system and apparatus of the present invention.

FIG. 15 illustrates DigTV according to an exemplary implementation of the present invention providing a GUI 1500 displaying a graphical and textual report 1500 showing results of analysis of the influence related to a broadcast. For example, the report 1500 shows an influence of a broadcast providing a view of what was said about a topic, where and how many people saw the clip by market, and then how that clip correlates to activity in social media.

FIGS. 1, 16, 17 and 18 illustrate a GUI providing access to module 108 DigBar according to an exemplary embodiment of the present invention illustrating a GUI providing a computer implemented system, method and apparatus including GUI 1600, 1700, 1800.

FIG. 1 illustrates at least one module 107 ("AdSlider") according to an exemplary embodiment of the present invention providing a computer system, method and apparatus implementing one or more modules communicating with ALPACA, to understand conversations that are happening in real time on one or more Websites and to "slide in" content that is relevant to the conversation on the Website as it is happening, in real time.

Exemplary implementations of AdSlider 107 provide for multi-source social media context and sentiment content serving. Exemplary embodiments of the present invention provide for a method, system and apparatus for delivering rich media content/text into pre-determined ad units on social media sites based on the topic and sentiment of user generated comments. For example, exemplary embodiments of the present invention provide for at least the following features:

1. Allowing overlay of medium taxonomies for entire campaigns, in real time.
2. Customized assets per site and target different taxonomies per site rather than per campaign, in real time.
3. Can separate taxonomies by audience type per site per campaign, in real time.
4. Reports IP address who is viewing, click throughs, conversions.

Conventionally, ads can be served geo-targeted and by the general topic of the site, but conventional technology does not provide for serving ads based on topic and sentiment of the actual conversations as they are happening. Exemplary embodiments of the present invention provide for real relevancy that is also based on time, place and sentiment not just high level context.

AdTracking

Exemplary implementations of the present invention provide a computer system, method and apparatus implementing one or more modules communicating with ALPACA, to track user engagement on Websites and monitor changes in the sentiment polarity of user generated content in response to the content being delivered by multi-source social media context and sentiment content serving. Exemplary implementations of the present invention provide for at least the following: tracking advertisements, and topics, sentiment(s), and top conversation(s) related to the advertisements; and tracking advertisement related content across IP address so that topic and sentiment profile can be created per IP address.

Exemplary embodiments of the present invention provide for Multi-Source and Sentiment Content Tracking. Exemplary embodiments of the present invention provide for a method, system and apparatus for tracking user engagement and changes in the sentiment polarity of user generated content in response to the content being delivered by multi-source SM context and sentiment content serving. For example, exemplary embodiments of the present invention provide for at least the following features:
1. Tracks all ads but also all topics, sentiment, top conversation topics, and sentiment.
2. Allows to track across IP address so that topic and sentiment profile can be Created per IP address.

Additionally, exemplary implementations of the present invention provide a computer implemented system, method and apparatus combining one or more modules that communicate with ALPACA. For example, an exemplary implementation of the present invention provides one or more computer implemented modules, applied individually or in combination, for observing trends in social media that are then picked up and repeated in broadcast. One or more modules implement a relational comparison of broadcast closed caption ("cc") comments to social media comments based on geographic distribution. DigTV and NPL, according to exemplary implementations, analyze and report on closed caption signals broadcasted from television stations and/or social media content. An exemplary implementation of the present invention provide a method, system and apparatus for mapping a geographic reach of television and radio stations to the topics and sentiments, then comparing that data to readership of similar comments within social media and measure the response(s) in a social media sphere.

Additionally, an exemplary implementation of the present invention provides a computerized system, method and apparatus that observes trends in social media that are then picked up and repeated in broadcast media. Additionally, various exemplary implementation of the present invention provide for at least the following additional features:
1. Geo-location of comment readers linked to geo footprint of a broadcast television or radio station.
2. Number of television mentions to the number of SM mentions.
3. Alignment of television sentiment to social media sentiment.
4. Number of viewers in relation to the number of readers expressed as a relation to population of a geographic area.

Accordingly, exemplary implementations of the present invention address deficiencies in the conventional art by providing a system, method and apparatus treating television content as a database of text, making television content the same as social medial or any other database of text. For example, an exemplary implementation of the present invention provides one or more modules communicating with ALPACA for correlating between messages people see on television and what they write on social media, thus, providing a total picture of sentiment, top topics and impact of messages. Conventional technologies fail to provide at least these and/or related features.

Exemplary embodiments of the present invention utilizing ALPACA provide a system, method and apparatus implementing Web crawlers that mine the entire Internet looking for topics of conversation. The Web crawlers, according to exemplary implementations of the present invention, go deep into the Internet to look for data that even the conventional crawlers and search engines do not and cannot return. ALPACA can start influence anywhere and the crawlers need to be sure that they have found even the smallest pockets of conversations occurring on the Internet.

Exemplary embodiments of the present invention utilizing ALPACA provide a system, method and apparatus implementing screening Internet content for delivering efficient and most valuable data gathered from various media sources. An exemplary implementation of the present invention provides for screeners previewing sites to ensure their validity and computer implemented removal of known spam, junk, link farms and other undesirable, unwanted and not-on-topic content. This is performed once on our first run for any topic but the result is an unparalleled foundation for all work going forward for that topic—clean content devoid of spam with the comprehensive inclusion of all valid sites across the Internet.

Exemplary embodiments of the present invention utilizing ALPACA provide a system, method and apparatus implementing Natural Language Processing ("NPL") to put complex and industry-specific text into proper context for one or more given topic. NPL, after screening, is trainable over a short and/or long term period time to put complex and industry-specific text into proper context for each topic. Also, ALPACA can implement one or more screening processes, at least once per topic, to analyze a small subset of the overall content to determine their sentiment and relevance for creating a training set. The training set can be implemented to organize the rest of the overall content, which could be tens of millions of data points.

Exemplary embodiments of the present invention utilizing ALPACA provide a system, method and apparatus implementing an internal search engine allowing users to search through a subset and/or all of the retained content, with any keyword and as many times as they want. According to exemplary implementations of the present invention, topics can be converted into keywords by parsing conversations apart into individual terms (keywords and/or phrases), and providing a weight for each term according to the usage and sentiment for the term.

Exemplary embodiments of the present invention utilizing ALPACA provide a system, method and apparatus implementing an automated sentiment analysis component of the NLP to implement algorithms combined with the screening to identify and mark conversations found according to a topic and/or a sentiment. According to exemplary implementations of the present invention, a default sentiment continuum can positive, negative, and neutral. Sentiment(s) can customizable according to various implementations and such as delight through horror, satisfied to unsatisfied, and many others. The sentiment analysis, according to an exemplary implementation of the present invention, identifies emotions, sarcasm and anger.

Exemplary embodiments of the present invention utilizing ALPACA provide a system, method and apparatus implementing associating geo-location with content according to the readership in a designated market area, and plotting the geo-location information on a map (further providing features for point-and-click). The map with the associated geo-location information, according to an exemplary implementation of the present invention, can be viewed globally, nationally and regionally. An exemplary implementation of the present invention provides for drilling down to individual conversations and their sentiment for the associated geo-location and content.

Exemplary embodiments of the present invention utilizing ALPACA, provide a system, method and apparatus implementing knowledge assessment for the gathered content and/or information. An exemplary implementation of the present invention provides for an NLP that can assess sentiment and sentence construct to identify knowledge level of the writers of content or conversations, and further, characterizes that knowledge (for example, as high, medium, or low) Implementations of the present invention identify key influential posters by their readership as well as level of knowledge.

Exemplary embodiments of the present invention utilizing ALPACA provide a system, method and apparatus implementing publishing content processed and analyzed by ALPACA. The information processed and analyzed by the ALPACA platform can be published in various ways including but not limited to one or more modules implemented to complement ALPACA or custom built for specific implementation(s).

Further, various exemplary embodiments and/or implementations of the present invention provide a computer implemented method, systems and/or apparatus for content syndication tracking, semantic knowledge assessment, sentiment index, site influence index, social media impact index, social media comment identification and parsing, multi-source social media context and sentiment content serving, multi-source social media context and sentiment content tracking, stream-based sentiment classification, relational comparison of broadcast C comments based on geographic distribution, geographic sentiment index, influencer index, queriable neutral network of aggregated social media data by demographic profile, social sentiment search and sentiment search frequency calculator.

Indexes

Exemplary embodiments and/or implementations of the present invention provide for indexing content on the Internet for finding patterns and trends that allow content to become predictive. Indexes can be influenced by AdSlider and WebDig to gain insights that also influence the indexes with information that might be unique. According to an exemplary embodiment of the present invention, AdSlider can be used to gain extended intelligence by polling and surveying posters to understand why and how decisions are made. According to an exemplary embodiment of the present invention, WebDig can dig into specific topics that are new, potentially impactful, or disruptive, and coordinate with indexes to signal the need for more information regarding a given content. Index can be combined with one or more other indexes.

Exemplary embodiments and/or implementations of the present invention provide a computer implemented method, systems and/or apparatus providing for at least one of the following indexes.

Reputation Strength Index

Figure 27A:
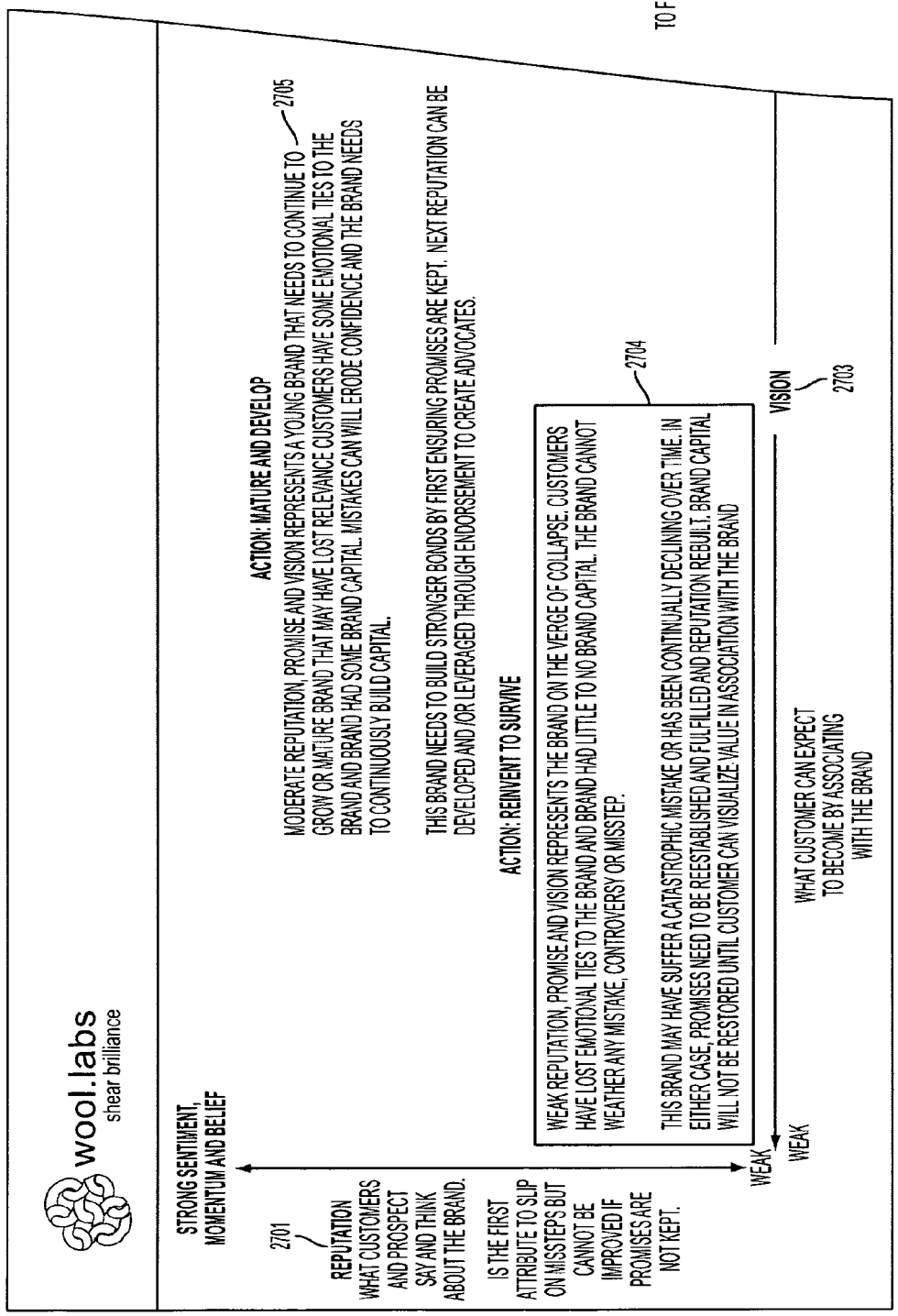
FIGS. 27-29 are flow diagrams that illustrate another example of a social cognition platform, according to a method, system and apparatus of the present invention.
Figure 27B:
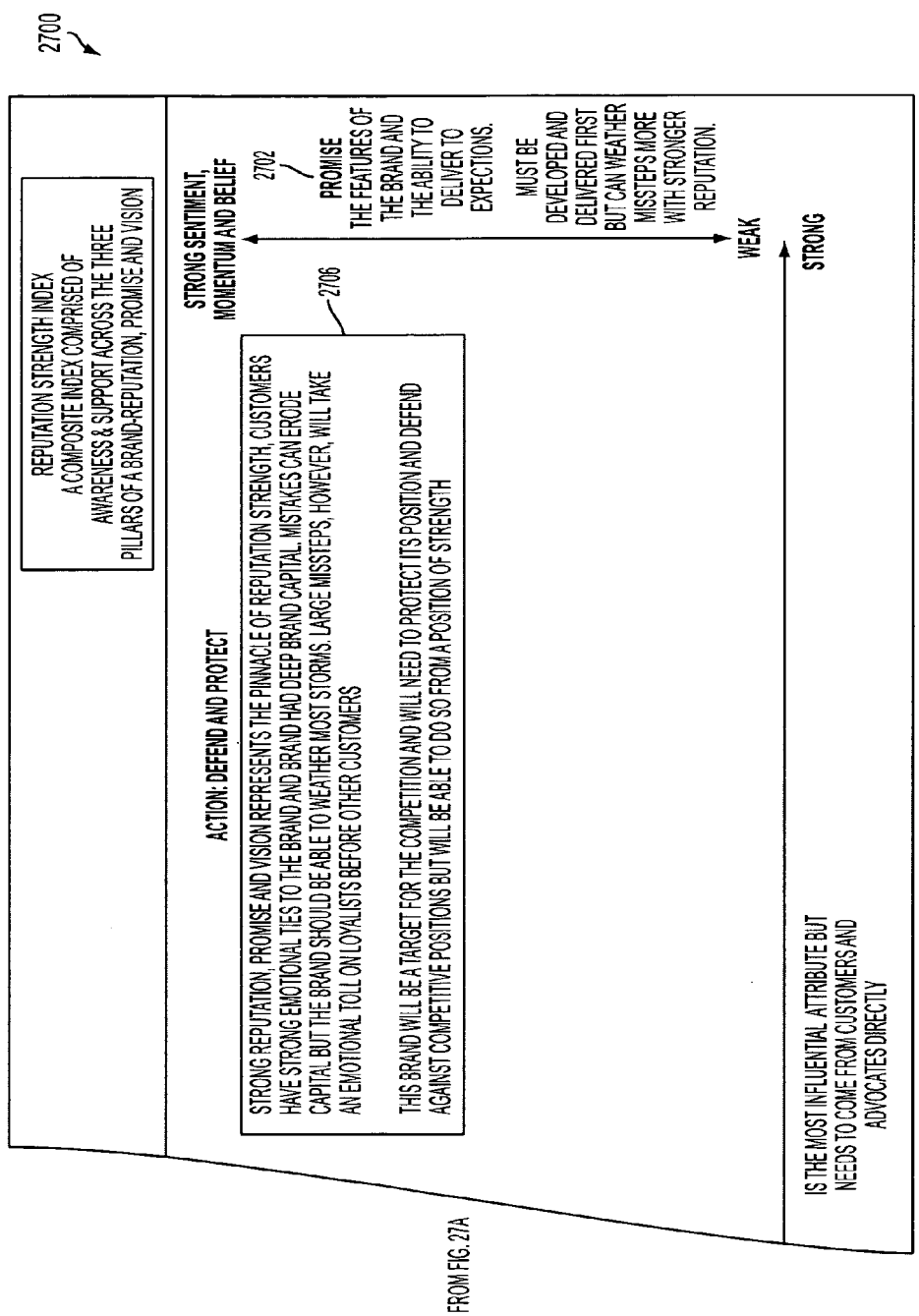
Figure 28A:
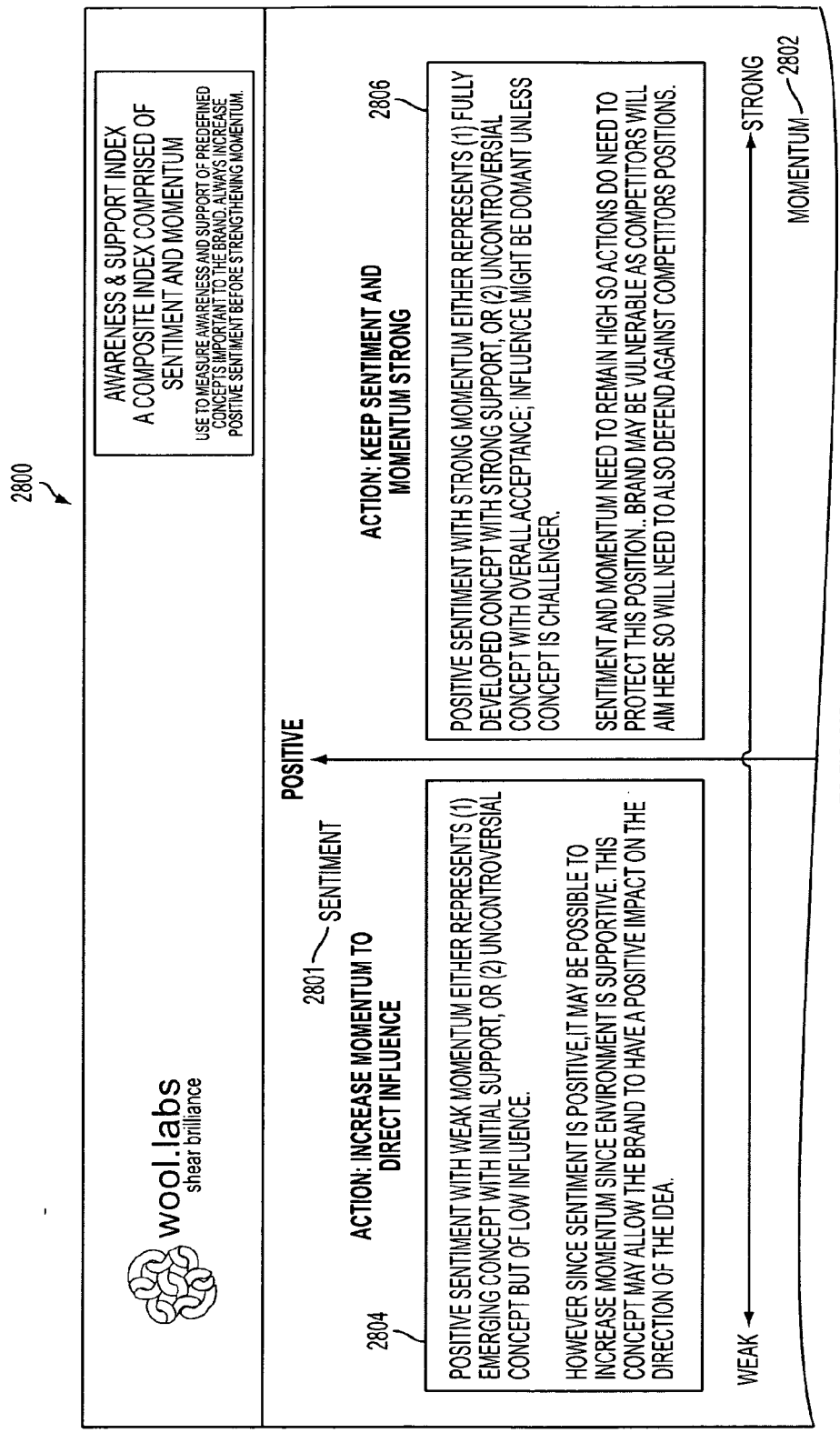
Figure 28B:
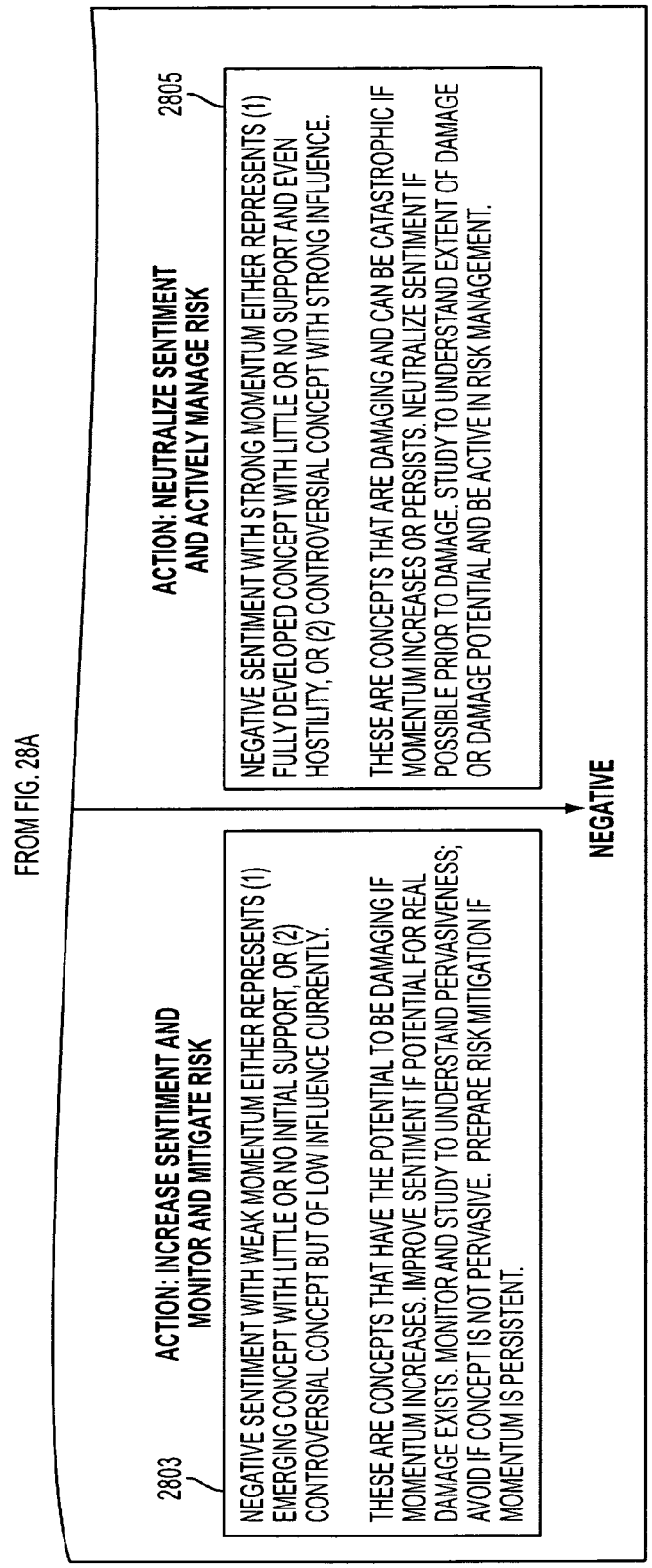
Figure 29A:
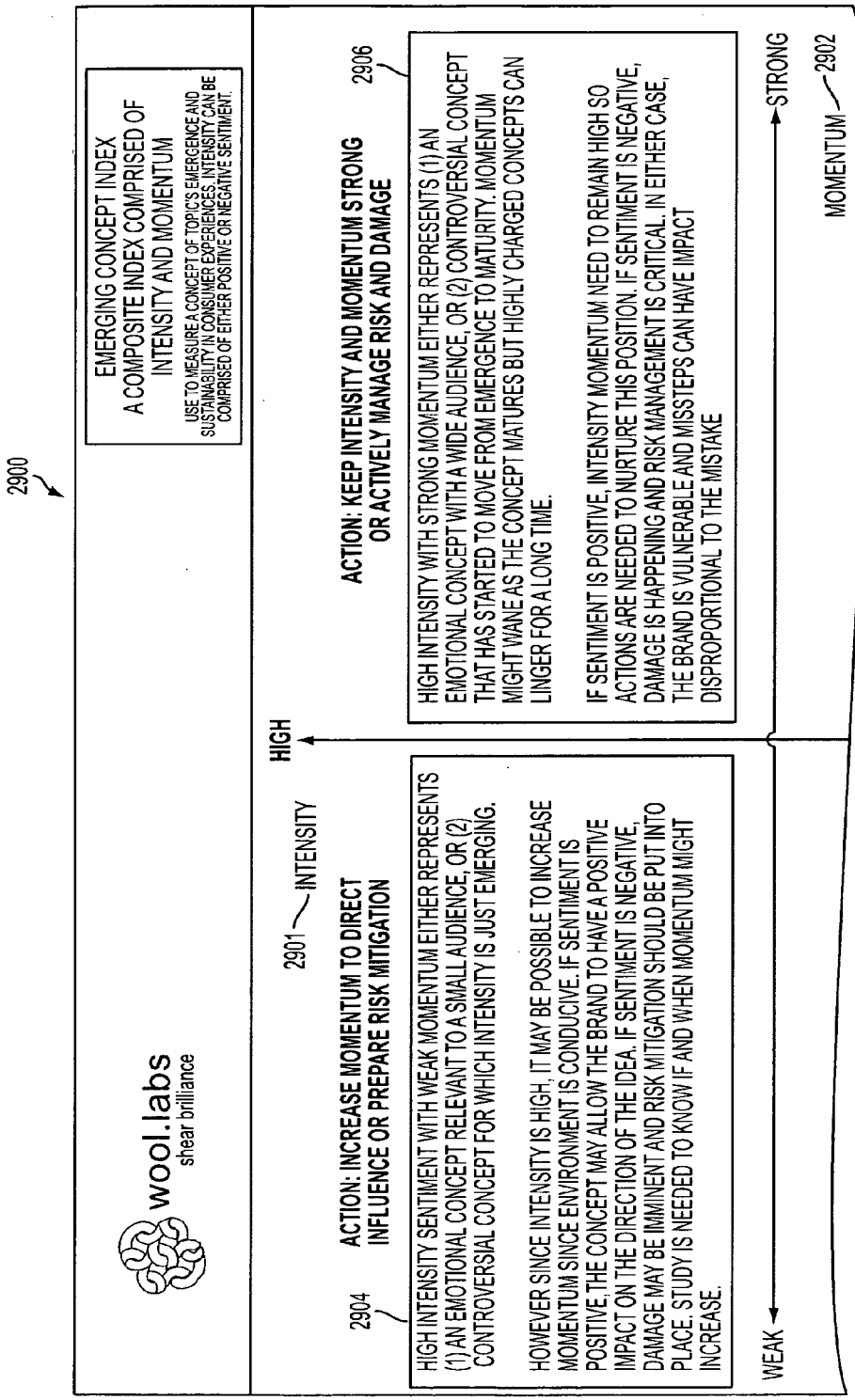
Figure 29B:
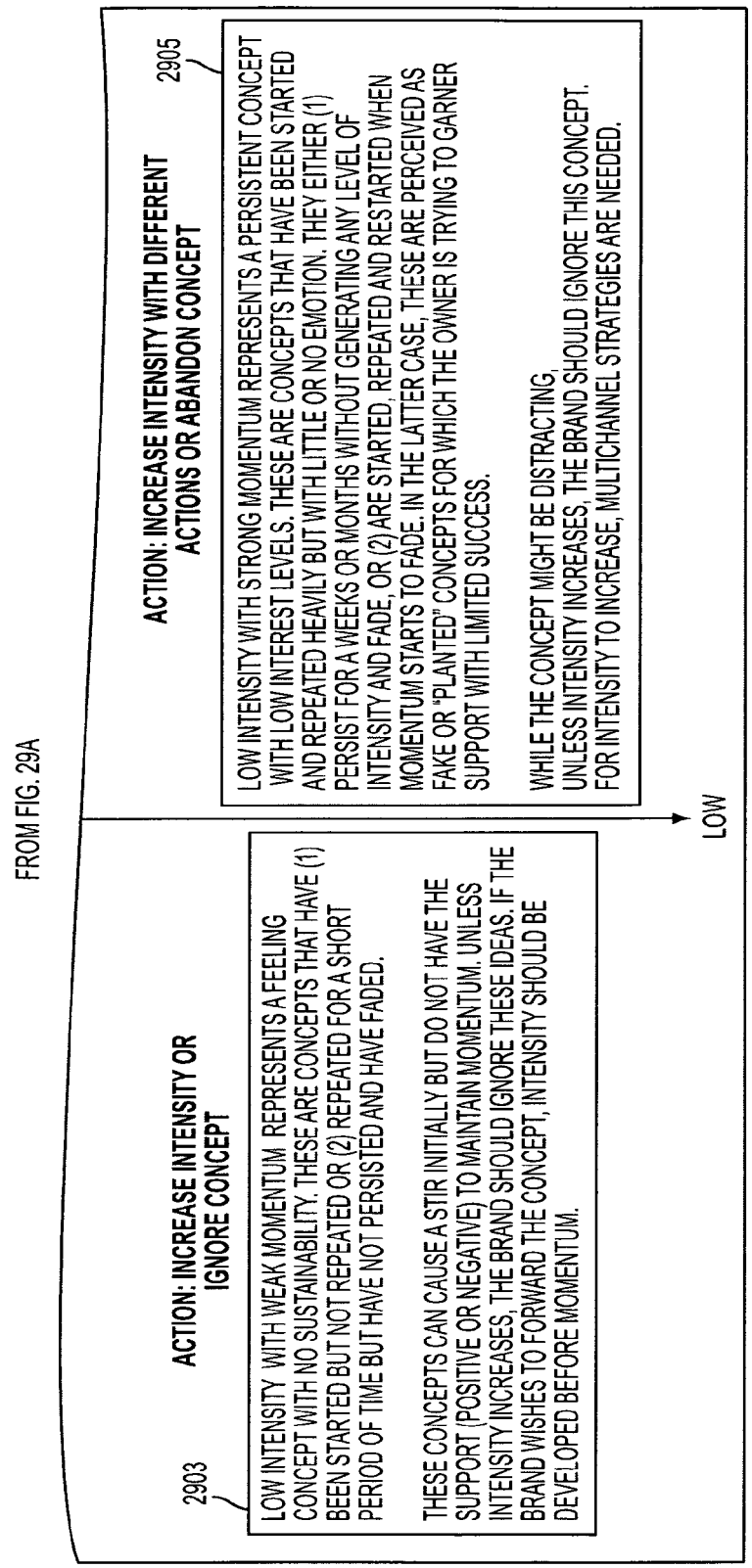

FIG. 27 illustrates a reputation strength index, according to an exemplary embodiment of the present invention. For example, the reputation strength index is a composite index comprised of awareness and support across the three pillars of a brand (reputation, promise, and vision). Reputation is one pillar of the reputation strength index that provides an attribute for measuring what entities (such as customers, prospects) say and think about a brand 2701. Reputation is the first attribute to slip on missteps but cannot be improved if promises are not kept. The range for measuring reputation is from weak reputation to strong sentiment, momentum and belief. Promise is another pillar of the reputation strength index that provides a characteristic for measuring the features of the brand and the ability to deliver to expectations 2702. Promise can be developed and delivered first but can weather missteps more with stronger reputation. The range for measuring promise is from weak ability to deliver expectation to strong sentiment, momentum and belief in delivering expectation. Vision is another pillar of the reputation strength index that provides an attribute for measuring what customers can expect to become by associating with the brand. Vision is influenced more than the other pillars but needs to come from customers and advocates directly. The range for measuring vision is from weak vision to strong vision.

According to an exemplary implementation of the present invention, when a brand has weak reputation, weak promise, and weak vision, then the brand is on the verge of collapse, and the action for a brand must take is to reinvent to survive 2704. Specifically, according to this example, customers have lost their emotional ties to the brand and the brand had little to no brand capital. The brand cannot weather any mistake, controversy or misstep. The brand, according to this example, may have suffered a catastrophic mistake or has been continually declining over time. In either case, promises need to be reestablished and fulfilled and reputation rebuilt. Brand capital will not be restored until customers can visualize value in association with the brand.

According to an exemplary implementation of the present invention, a brand having a mid-range reputation, mid-range promise, and mid-range vision represents a young brand that needs to continue to grow or a mature brand that may have lost relevance 2705. Customers have some emotional ties to the brand and the brand had some brand capital. Mistakes can erode confidence and the brand may need to continuously build capital. The brand, according to this example, may need to build stronger bond by first ensuring that promises are maintained, and then develop and/or leverage reputation through endorsement to create advocates. The action item for the brand can be to mature and develop further.

According to an exemplary implementation of the present invention, a brand having a strong reputation, strong vision and strong promise represents the pinnacle of reputation strength 2706. Customers have strong emotional ties to the brand and the brand has deep brand capital. Mistakes can erode capital but the brand should be able to weather most storms. Large missteps, however, can take an emotional toll on loyalists before other customers. The brand, according to this example, can be a target for a competition and will need to protect its position and defend against competitive positions but will be able to do so from a position of strength. The action item for the brand can be to defend and protect.

Awareness & Support Index

FIG. 27 illustrates an awareness and support index, according to an exemplary embodiment of the present invention. For example, the awareness and support index is a composite index comprised of sentiment 2801 and momentum 2802 for measuring awareness and support of predefined concepts important to a brand. Sentiment can be measured on a range from negative sentiment to positive. Momentum can be measured on a range from weak momentum to strong. One goal for a brand, according to an exemplary embodiment, can be to increase positive sentiment before strengthening momentum.

According to an exemplary implementation of the present invention, a brand having a negative sentiment and weak momentum 2803 represents either an emerging concept with little or no initial support, or represents controversial concept but of low influence currently. Emerging and controversial concepts have the potential to be damaging if momentum increases. A brand can improve sentiment if potential for real damage exists. The brand can be monitored for and studied to understand pervasiveness, and avoid if the concept is not pervasive. The brand can prepare risk mitigation if momentum is persistent. The action item for the brand is to increase sentiment, and monitor and mitigate risk.

According to an exemplary implementation of the present invention, a brand having a positive sentiment and weak momentum 2804 represents either an emerging concept with initial support or uncontroversial concept but of low influence. However, since sentiment is positive, it may be possible to increase momentum since the environment is supportive. This concept may allow the brand to have a positive impact on the direction of the idea. The action item is to increase momentum to direct influence.

According to an exemplary implementation of the present invention, a brand having a negative sentiment and strong momentum 2805 represents either a fully developed concept with little or no support and even hostility, or controversial concept with strong influence. These are concepts that can be damaging and can be catastrophic if momentum increases or persists. A brand can neutralize sentiment if possible prior to damage, and study to understand extent of damage or damage potential and be active in risk management. The action item is to neutralize sentiment and actively manage risk.

According to an exemplary implementation of the present invention, a brand having a positive sentiment and strong momentum 2806 represents either a fully developed concept with strong support, or uncontroversial concept with overall acceptance. Influence might be dormant unless concept is challenged. Sentiment and momentum may need to remain high so actions may be not be needed to protect this position. A brand may be vulnerable as competitors will aim here so may also need to defend against competitive positions.

Emerging Concept Index

FIG. 27 illustrates an emerging concept index, according to an exemplary embodiment of the present invention. For example, the emerging concept index is a composite index comprised of intensity 2901 and momentum 2902 for measuring a concept or topic's emergence and sustainability in consumer experiences. Intensity can be comprised of either positive or negative sentiment. Intensity can be measured on a range from low intensity to high. Momentum can be measured on a range from weak momentum to strong.

According to an exemplary implementation of the present invention, a brand having a low intensity and weak momentum 2903 represents a fleeting concept with no sustainability. These are concepts that have been started but not repeated or repeated for a short time period but have not persisted and have faded. These concepts can cause a stir initially but do not have the support (positive or negative) to maintain momentum. Unless intensity increases, the brand should ignore these ideas. If the brand wishes to forward the concept, intensity can be developed before momentum. The action item can be to increase intensity or ignore concept.

According to an exemplary implementation of the present invention, a brand having a high intensity and weak momentum 2904 represents either an emotional concept relevant to a small audience or controversial concept for which intensity is just emerging. However, since intensity is high, it may be possible to increase momentum since environment is conductive. If sentiment is positive, the concept may allow the brand to have a positive impact on the direction of the idea. If sentiment is negative, damage may be imminent and risk mitigation should be put into place. Further study may be needed to comprehend if and when momentum increases. The action item can be to increase momentum to direct influence or prepare risk mitigation.

According to an exemplary implementation of the present invention, a brand having a high intensity and strong momentum 2905 represents a persistent concept with low interest levels. These are concepts that have been started and repeated heavily but with little or no emotion. They either persist for weeks or months without generating any level of intensity and fade, or are started, repeated and restarted when momentum starts to fade. In the latter case, these are perceived as fake or "planted" concepts for which the owner is trying to garner support with limited success. While the concept might be distracting, unless intensity increases, the brand can ignore this concept. For intensity to increase, multi-cannel strategies may be needed. The action item can be to increase intensity with different actions or abandon the concept.

According to an exemplary implementation of the present invention, a brand having a high intensity and strong momentum 2903 represents either an emotional concept with a wide audience, or controversial concept that has started to move from emergence to maturity. Momentum might wane as the concept matures but highly charged concepts can linger for a long time. If sentiment is positive, intensity momentum may need to remain high so actions may be needed to nurture this position. If sentiment is negative, damage is happening and risk management is critical. In either case, the brand is vulnerable and missteps can have impact disproportional to the mistake.

Sentiment Index

The sentiment index, according to an exemplary embodiment of the present invention provides for the proportion of positive conversations to negative conversations multiplied by the intensity of those conversations. Intensity is the extent to which conversations are judged disproportionately position or negative.

Site Influence Index

The site influence index, according to an exemplary embodiment of the present invention provides for a site influence index that ranks sites based on traffic, user demographics, geographic reach, sentiment and user social content and update frequency positive or negative Social Media Impact Index The site influence index, according to an exemplary embodiment of the present invention provides for a sum of the site influence indexes for that company to the sum of the site influence indexes for a competitive or "entire" space. Space comprises as an industry sector, subsector or company of cohorts. Impact index can be done in total or by sentiment.

Geographic Sentiment Index

The geographic sentiment index, according to an exemplary embodiment of the present invention provides for tracking readership of social media comments, about specific topics, across geographic regions based on the proportion of positive conversations to negative conversations multiplied by the intensity of those conversations.

Influencer Index

The influencer index, according to an exemplary embodiment of the present invention provides for the influence index that looks at the demographic profile of an individual poster their duration of participation on that site, comment ratings, volume of responses, volume of threads created, and the size and influence rating of people within their social network.

Table 1, shown below, according to exemplary embodiments of the present invention, provides information and features related to indexes. For example, Table 1 (below) provides context, interface, range and calculation information relevant for each

TABLE 1

| Index | Context | In interface | Range | Calculation |
|---|---|---|---|---|
| Sentiment | Can be by topic, year or topic & year | always the same calc | (−100 to 100) | ((#positive conv/#total conv) − (#negative conv/#total conv)) |
| Momentum | volume over time per topic or subtopic | always the same calc | (0-1) or (0 to 100%) | (#total conv per year/#total conv over all years) |

TABLE 1-continued

| Index | Context | In interface | Range | Calculation |
|---|---|---|---|---|
| Awareness & Support | sentiment & Momentum per topic, subtopic or concept in subtopic; Can be comparative among audiences within Dig | Needs analyst intervention for concepts but can be calc just on topics and subtopics | (−100 to 100); cannot be greater than 100) | per topic, subtopic, concept, year and/or audience type (sentiment index × momentum index) |
| Emerging Concept | momentum & intensity over time | needs analyst to choose concept or subtopic | (0-1) | per topic, subtopic, concept, and/ or audience topic ( momentum index) + Intensity calc |
| Intensity | high, med, low | adjustment to sentiment, emerging concept, awareness and support | | 0 (low), 0.25 (med), (0.5) High |
| Reputation Strength | muliple layers of awareness & support | needs analysts input on concepts of brand reputation, promise and vision | (−100 to 100) | per topic, subtopic, concept, year and/or audience type (sentiment index × momentum index) |
| Site Influence Social Media Influence Knowledge level | | | | |

Exemplary embodiments of the present invention provide for the following additional features: Multi-source social medial context and sentiment content serving; multi-source social media context and sentiment content tracking; and stream-based sentiment classification, and queriable neutral network of aggregate social media data by demographic profile.

Multi-Source SM Context and Sentiment Content Serving

This exemplary feature provides for delivering rich media content/text into pre-determined ad units on social media sites based on the topic and sentiment of user generated comments.

Multi-Source SM Context and Sentiment Content Tracking

This exemplary feature provides for tracking user engagement and changes in the sentiment polarity of user generated content in response to the content being delivered by multi-source SM context and sentiment content serving.

Stream-Based Sentiment Classification

This exemplary feature provides for utilization of the stream computing capabilities of graphic processing units to run search, classification, and natural language processing calculations.

This exemplary feature provides for neural networks that are networks of simple processing elements which can exhibit complex global behavior determined by the connections between the processing elements and element parameters. While an artificial neural network does not have to be adaptive per se, its practical use comes with algorithms designed to alter the strength (weights) of the connections in the network to produce a desired signal flow. Exemplary implementations of the present invention would use vast quantities of social media data across pre-defined demographic profiles to model the behavior of social media participants over time. Once complete the model would be used to predict the reactions that social media participants would have based on new stimuli. For example an exemplary embodiment of the present invention could model people's reaction to new economic news in the housing sector based on aggregated comments about real estate in the past.

Social Sentiment Search

This exemplary feature provides for web searching of comments and posting on social networks, blogs and forums based on sentiment polarity of comments in conjunction with search terms. For example, the social sentiment search would find comments that discuss search term x in a negative way while talking about search term y in a positive way.

Sentiment Search Frequency Calculator

This exemplary feature provides for a web-spider control mechanism that analyses the frequency of user generated content postings rather than general site content updates to determine how often the spider should crawl the page. In addition it takes into account the sentiment intensity of individual comments and looks at overall site influence as determined by the site influence index.

The above-described exemplary embodiments of an apparatus, system and method in computer-readable media include program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Datasets can be maintained, for example, on non-transient computer-readable medium such as solid state memory, magnetic or laser-readable medium. The media may also be a transmission medium such as optical or metallic lines, wave guides, and so on, including a carrier wave transmitting signals specifying the program instructions, data structures, and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

We claim:

1. A method for processing and analyzing content from at least one Website on a communication network, the method comprising steps for:

receiving instructions, via a graphical user interface (GUI) executed by a server, to conduct a search for at least one keyword on the communication network;

launching a Web crawler, by the server, to search a plurality of Websites for at least one Website having content that includes said at least one keyword;

identifying Websites comprising at least one comment container, wherein said comment container includes at least one conversation;

creating a unique xpath, by the server, to said at least one comment container of each identified Website of said Websites, wherein the unique xpath comprises an extraction string dynamically generated to identify at least one of how to find comments, the date of a post on the Website, IP address, user name, and location;

saving, in a database, the unique xpath created for said at least one comment container of said each identified Website;

detecting using the unique xpath at least one conversation that includes the at least one keyword from search of a content of said comment container of said each Website accessible only by said unique xpath;

saving only a portion of the content of said comment container from said each Website that includes the at least one keyword along with information associated to each conversation of said identified conversation;

assigning, via a server, a categorical topic for said each conversation;

assigning, via a server, a sentiment for said each conversation; and generating at least one report, by the server, providing selected information related to said each conversation, along with categorical topic and sentiment for said each conversation, wherein the method is computer implemented, and wherein said assigning the sentiment comprises assigning a positive or negative value along a range, based on the words comprised in the content of the Website.

2. The method of claim 1, wherein the network comprises Internet.

3. The method of claim 1, wherein parsing is executed by generating a customized parser for each Website.

4. The method of claim 1, wherein the Website comprises a social media Website.

5. The method of claim 1, wherein assigning the topic comprises assigning a topic and/or a sub-topic for each conversation.

6. The method of claim 1, wherein the sentiment is assigned via input from a graphical user interface.

7. The method of claim 1, wherein a conversation comprises a logical string of a plurality of words.

8. The method of claim 1, wherein the at least one report comprises a geo-location relating to the origin of the conversations.

9. The method of claim 1, wherein the xpath comprises a programming structure to extract comments and/or associated data from the Website.

10. The method of claim 1, wherein the xpath for each Website is saved in a database.

11. An apparatus executing computer instructions for parsing, retrieving and reporting content from at least one Website on a communication network, the apparatus comprising a processor, a server for executing the steps:

receiving instructions, via a graphical user interface (GUI) executed by a server, to conduct a search for at least one keyword on the communication network;

launching a Web crawler, by the server, to search a plurality of Websites for at least one Website having content that includes said at least one keyword;

identifying Websites comprising at least one comment container, wherein said comment container includes at least one conversation;

creating a unique xpath, by the server, to said at least one comment container of each identified Website of said Websites, wherein the unique xpath comprises an extraction string dynamically generated to identify at least one of how to find comments, the date of a post on the Website, IP address, user name, and location;

saving, in a database, the unique xpath created for said at least one comment container of said each identified Website;

detecting using the unique xpath at least one conversation that includes the at least one keyword from search of a content of said comment container of said each Website accessible only by said unique xpath;

saving only a portion of the content of said comment container from said each Website that includes the at least one keyword along with information associated to each conversation of said identified conversation;

assigning, via a server, a categorical topic for said each conversation;

assigning, via a server, a sentiment for said each conversation; and generating at least one report, by the server, providing selected information related to said each conversation, along with categorical topic and sentiment for said each conversation, wherein the method is computer implemented, and said assigning the sentiment comprises assigning a positive or negative value along a range, based on the words comprised in the content of the Website.

12. A system for parsing, retrieving and reporting content from at least one Website on a communication network, the system comprising:

a database unit;

a first client unit;

a second client unit; and a server unit comprising a microprocessor executing steps for:

receiving at least one keyword, via a graphical user interface (GUI) executed on the first client unit, to conduct an Internet search;

launching a Web crawler to search a plurality of Websites for at least one Website having content that includes said at least one keyword;

identifying Websites comprising at least one comment container, wherein said comment container includes at least one conversation;

creating a unique xpath to said at least one comment container of each identified Website of said Websites, wherein the unique xpath comprises an extraction string dynamically generated to identify at least one of how to find comments, the date of a post on the Website, IP address, user name, and location;

saving, in the database unit, the unique xpath for said at least one comment container of said each identified Website;

detecting using the unique xpath at least one conversation that includes the at least one keyword from search of a content of said comment container of said each Website accessible only by said unique xpath;

saving only a portion of the content of said comment container from said each Website having the at least one keyword, in the database unit, along with associated conversation information of said identified conversation;

assigning a categorical topic for said each conversation;

assigning a sentiment for said each conversation, said assigning the sentiment comprises assigning a positive or negative value along a range, based on the words comprised in the content of the Website;

generating at least one report related to selected information for said each conversation, along with categorical topic and sentiment for said each conversation; and transmitting the at least one report to a second client unit;

wherein the database unit stores said xpath, said conversation, said topic, said sentiment, and content information for said each Website, the first client unit receives at least one of said xpath, said screening and said sentiment information via a graphical user interface, and the second client unit provides said report via a display unit.

* * * * *